United States Patent [19]
Cozby

[11] 4,395,885
[45] Aug. 2, 1983

[54] UNITARY STEAM ENGINE

[75] Inventor: John A. Cozby, Anaconda, Mont.

[73] Assignee: Cozby Enterprises, Inc., Anaconda, Mont.

[21] Appl. No.: 309,707

[22] Filed: Oct. 8, 1981

[51] Int. Cl.³ .............................................. F01K 11/00
[52] U.S. Cl. ...................................... 60/669; 60/660; 60/667; 60/670
[58] Field of Search ................ 60/643, 645, 660, 667, 60/669, 670, 716, 720

[56] References Cited
U.S. PATENT DOCUMENTS

| | | | |
|---|---|---|---|
| 1,216,777 | 2/1917 | Cooper | 60/669 |
| 4,213,999 | 7/1980 | Sharar | 60/669 X |
| 4,308,719 | 1/1982 | Abrahamson | 60/669 X |

Primary Examiner—Allen M. Ostrager
Assistant Examiner—Stephen F. Husar
Attorney, Agent, or Firm—Blair, Brown & Kreten

[57] ABSTRACT

Disclosed herein is a steam engine suitably constructed to serve as a prime mover. The device includes a furnace in which a liquid can be heated so as to change its phase, the thus formed gas directed to an engine whereupon its expansion within piston/cylinder arrangements provides useful work. The exhausted steam, still endowed with extractable energy, is passed through various regenerative pump mechanisms and the like for very efficient utilization of much of the inherent energy.

42 Claims, 47 Drawing Figures

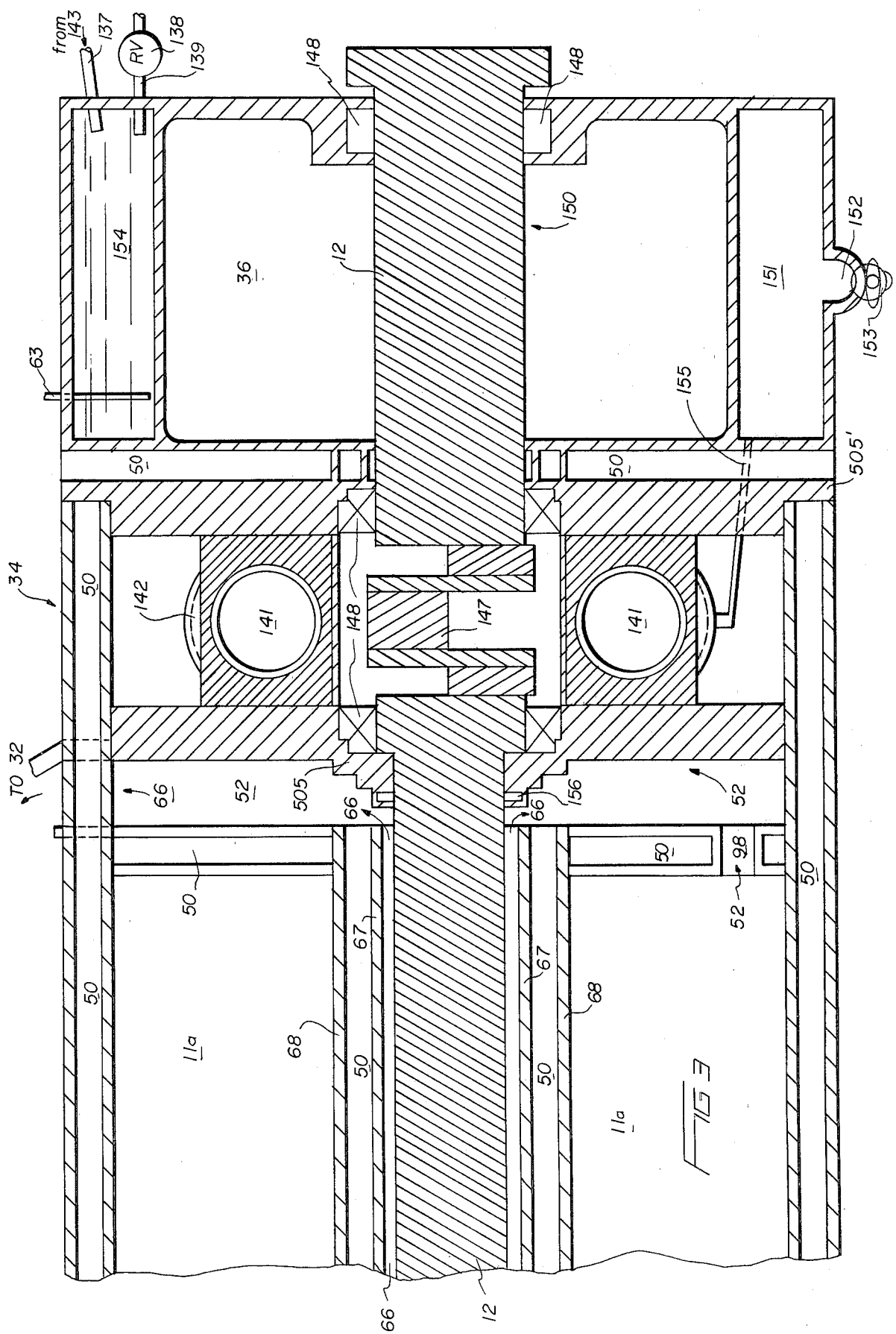

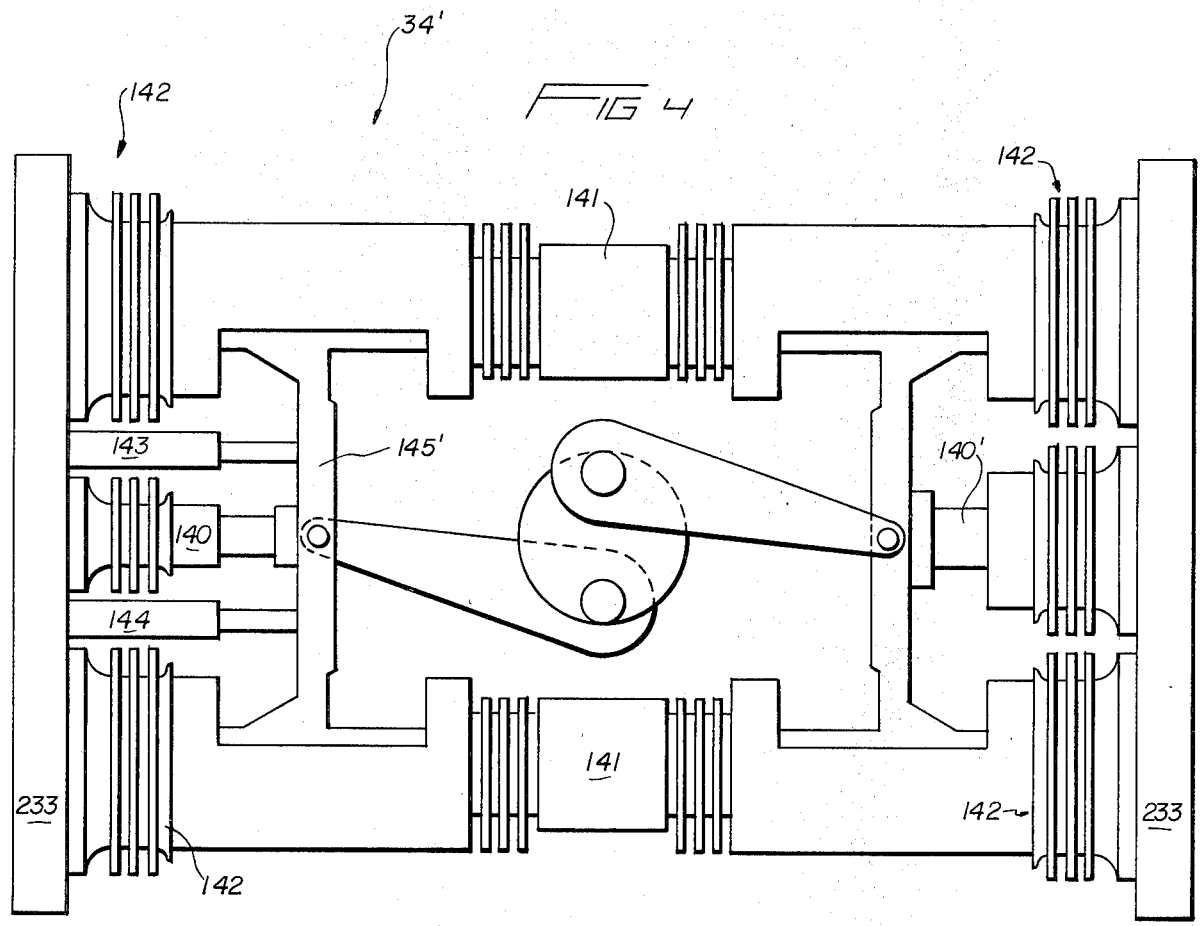
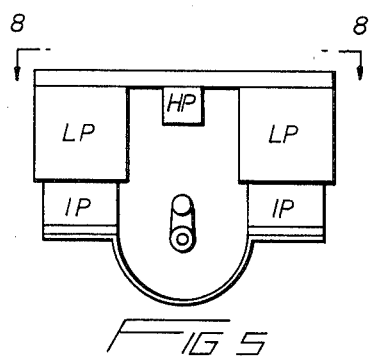
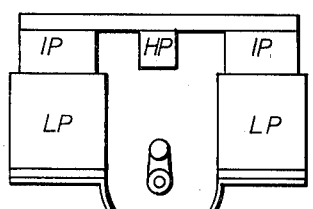
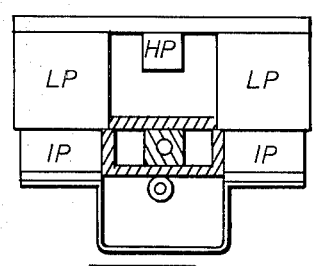
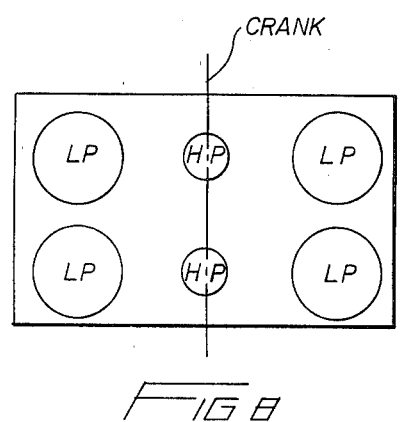
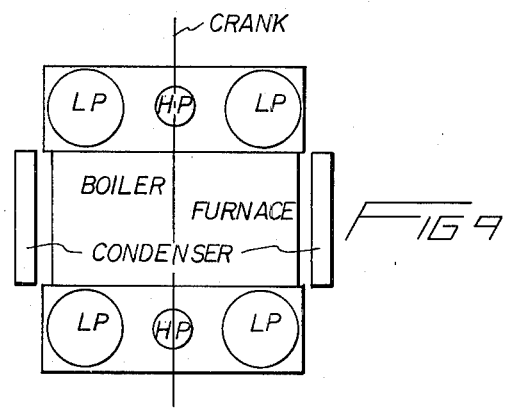

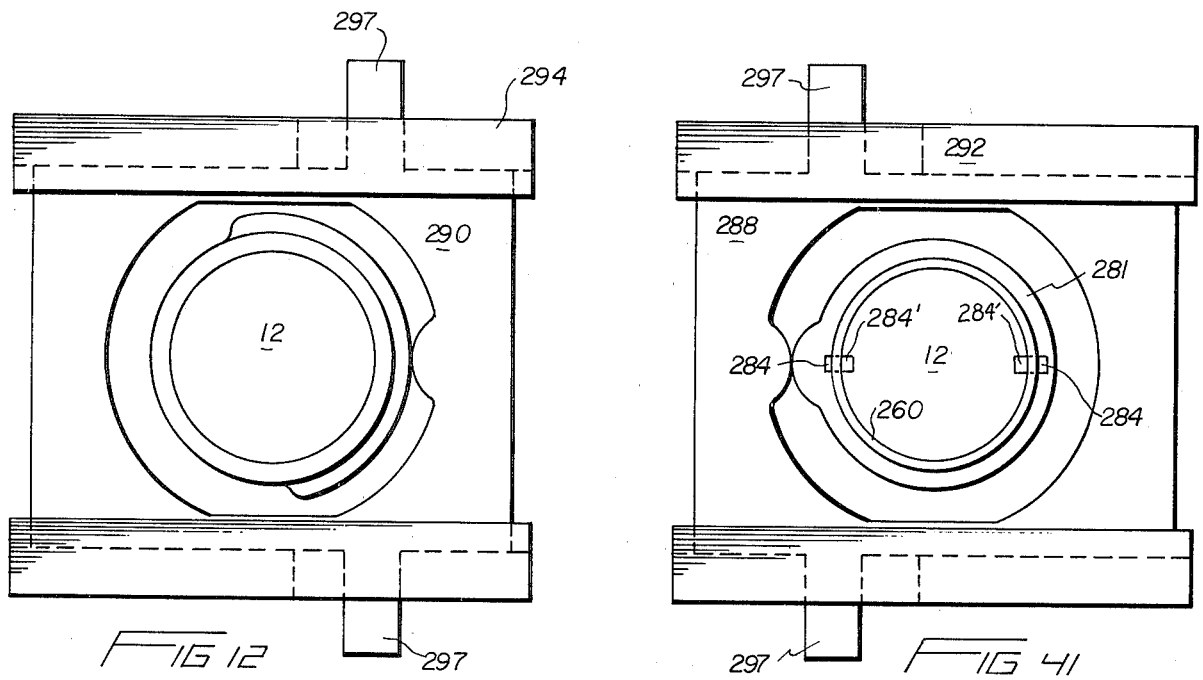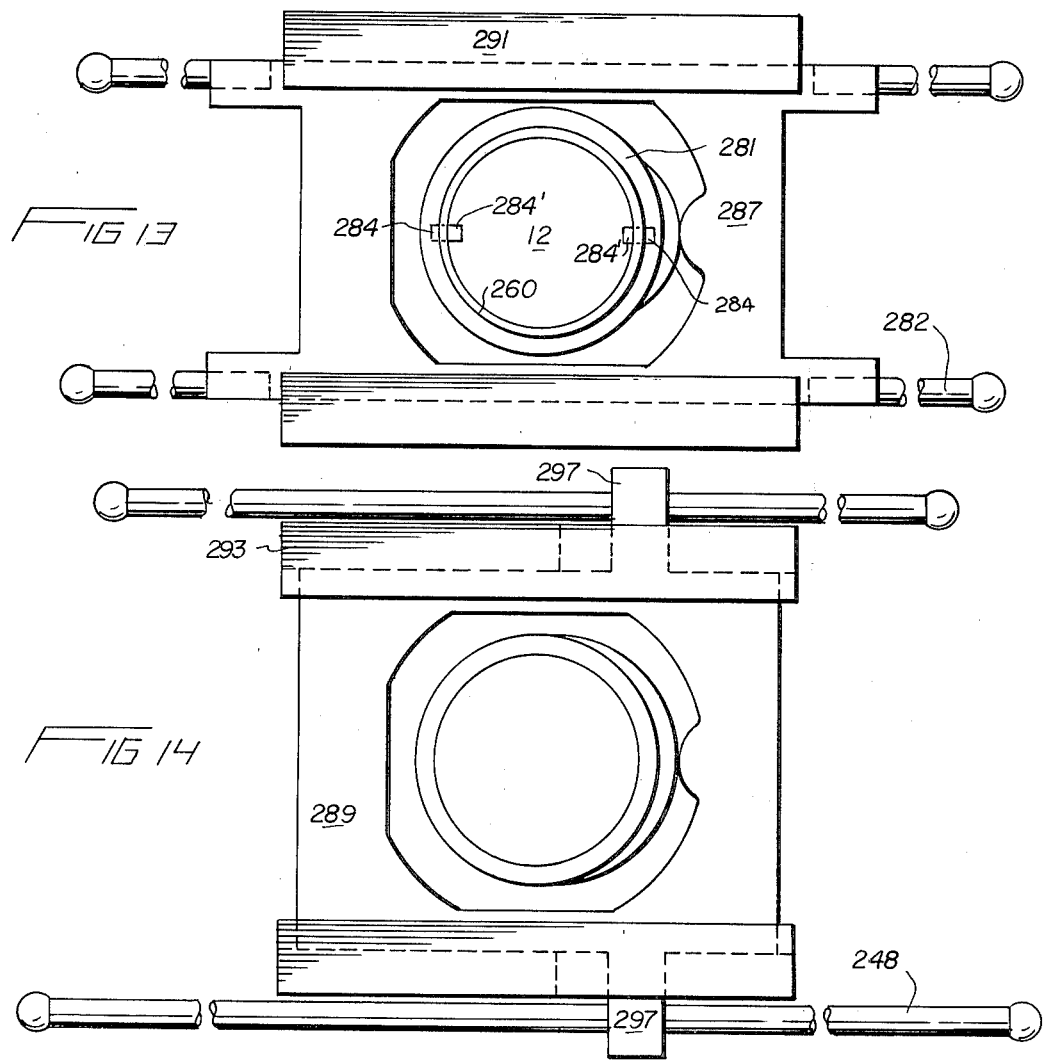

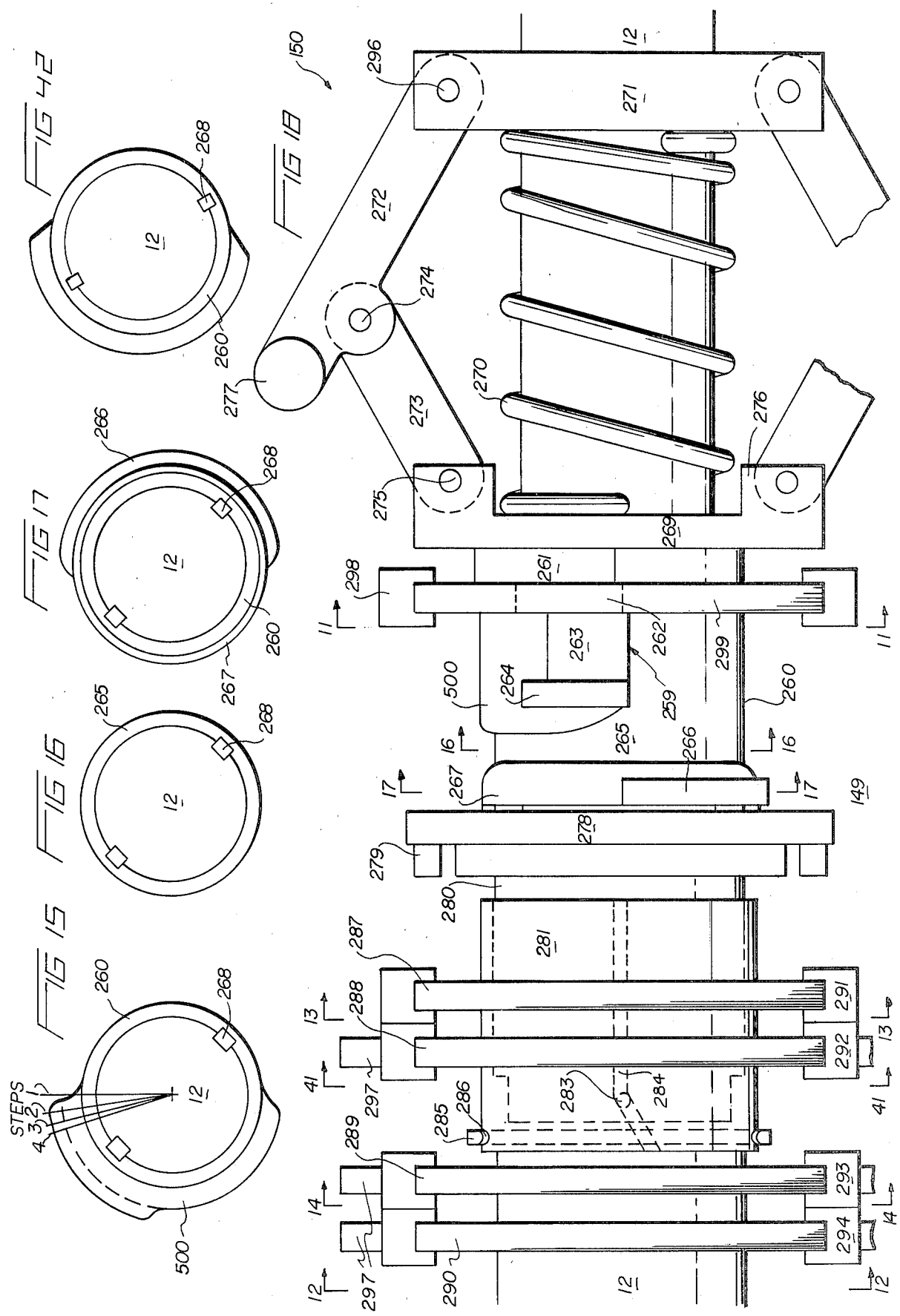

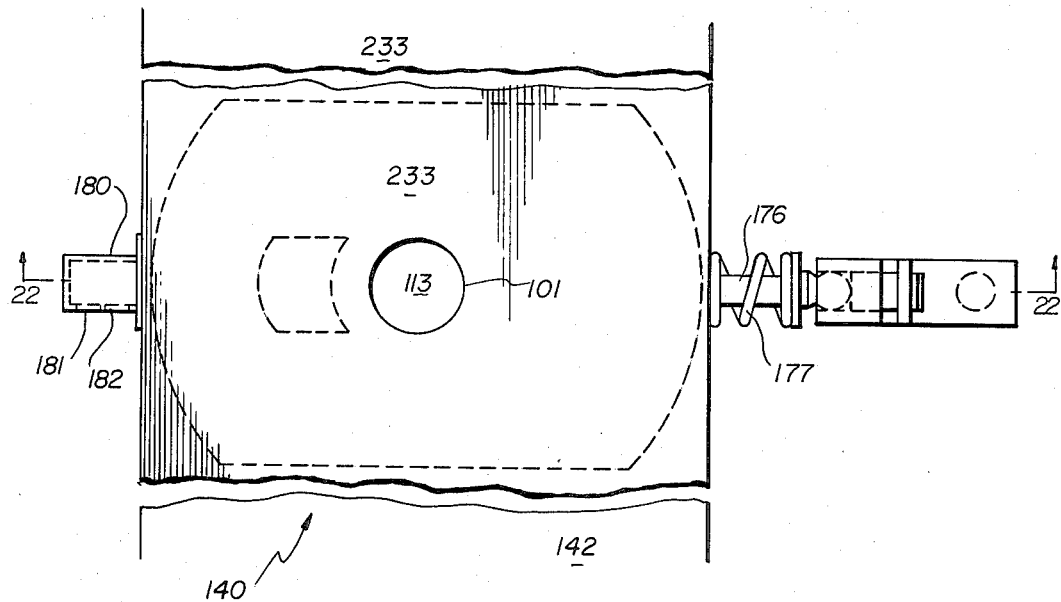
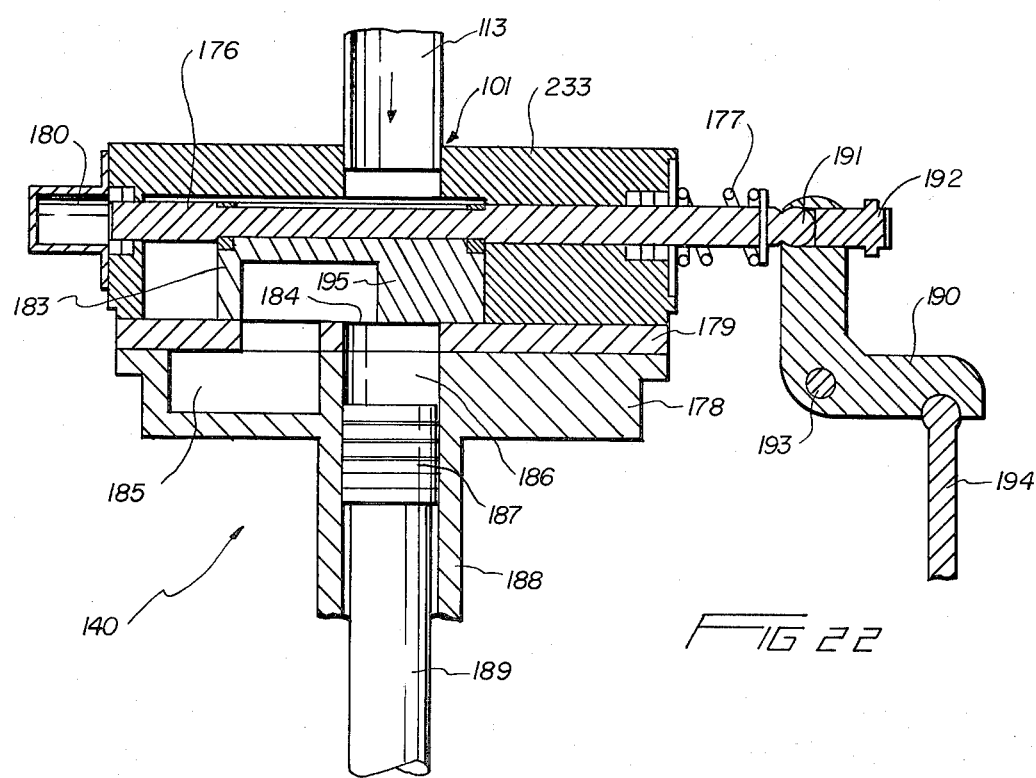

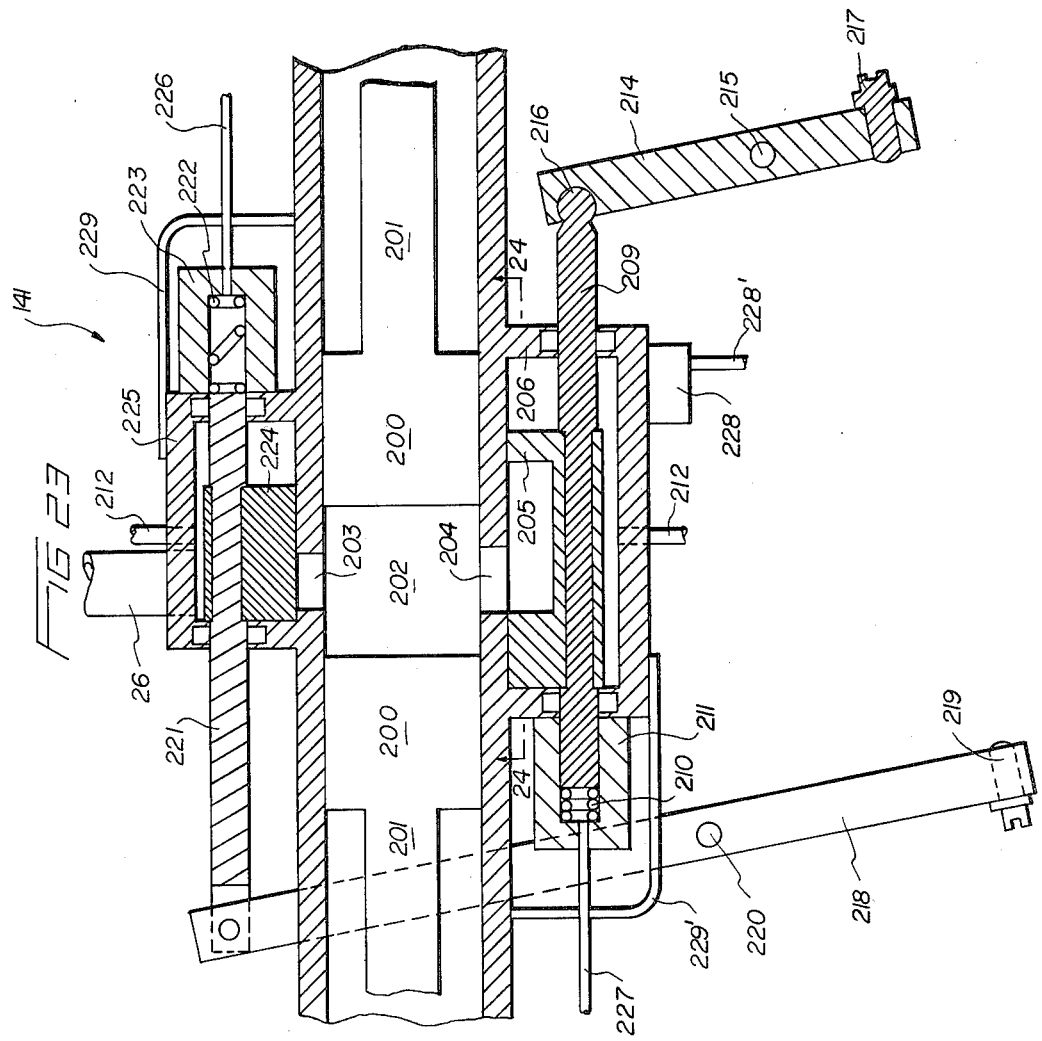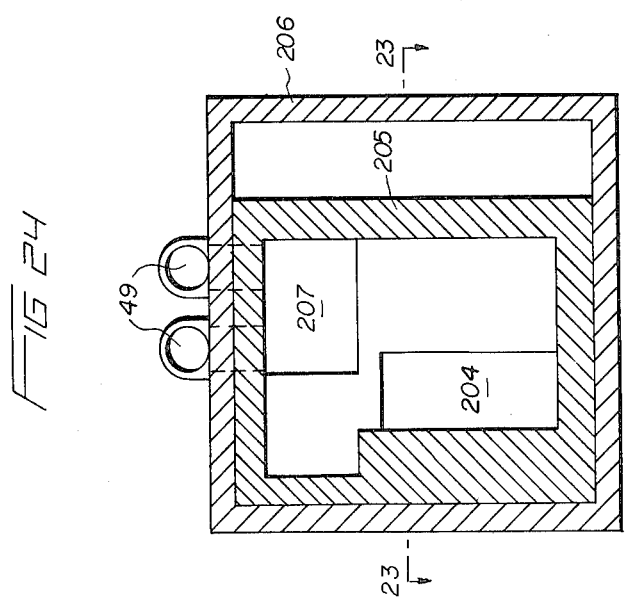

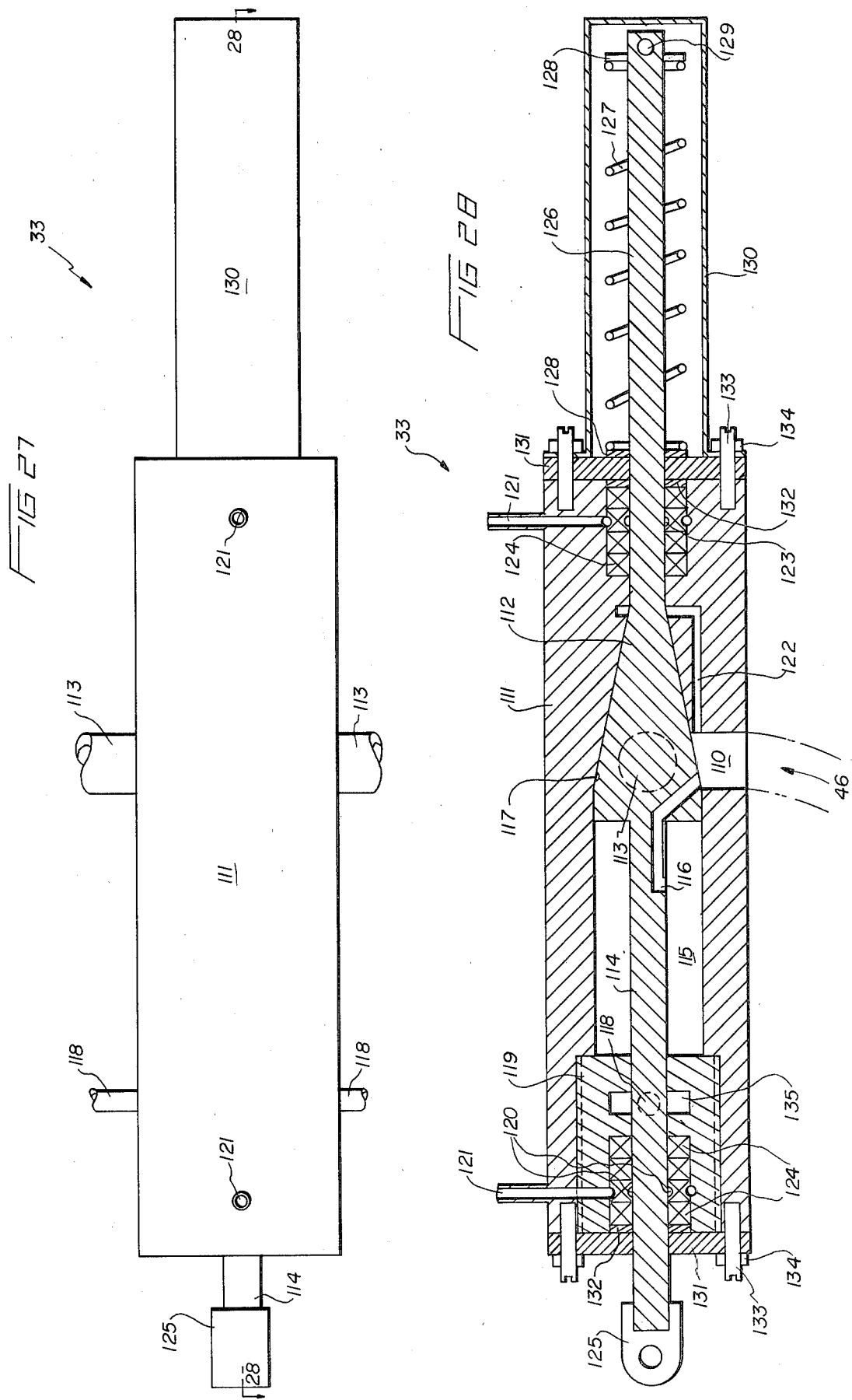

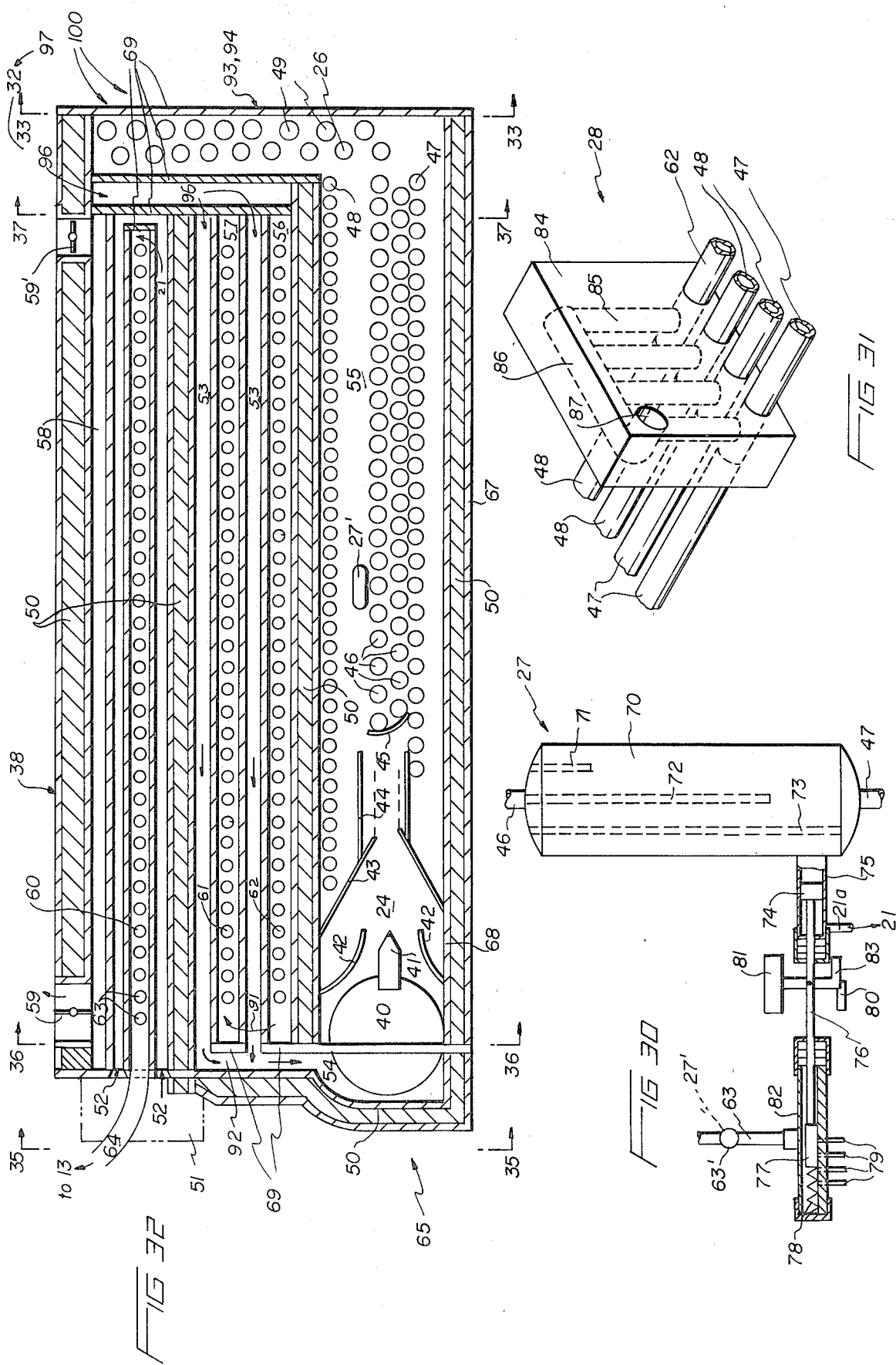

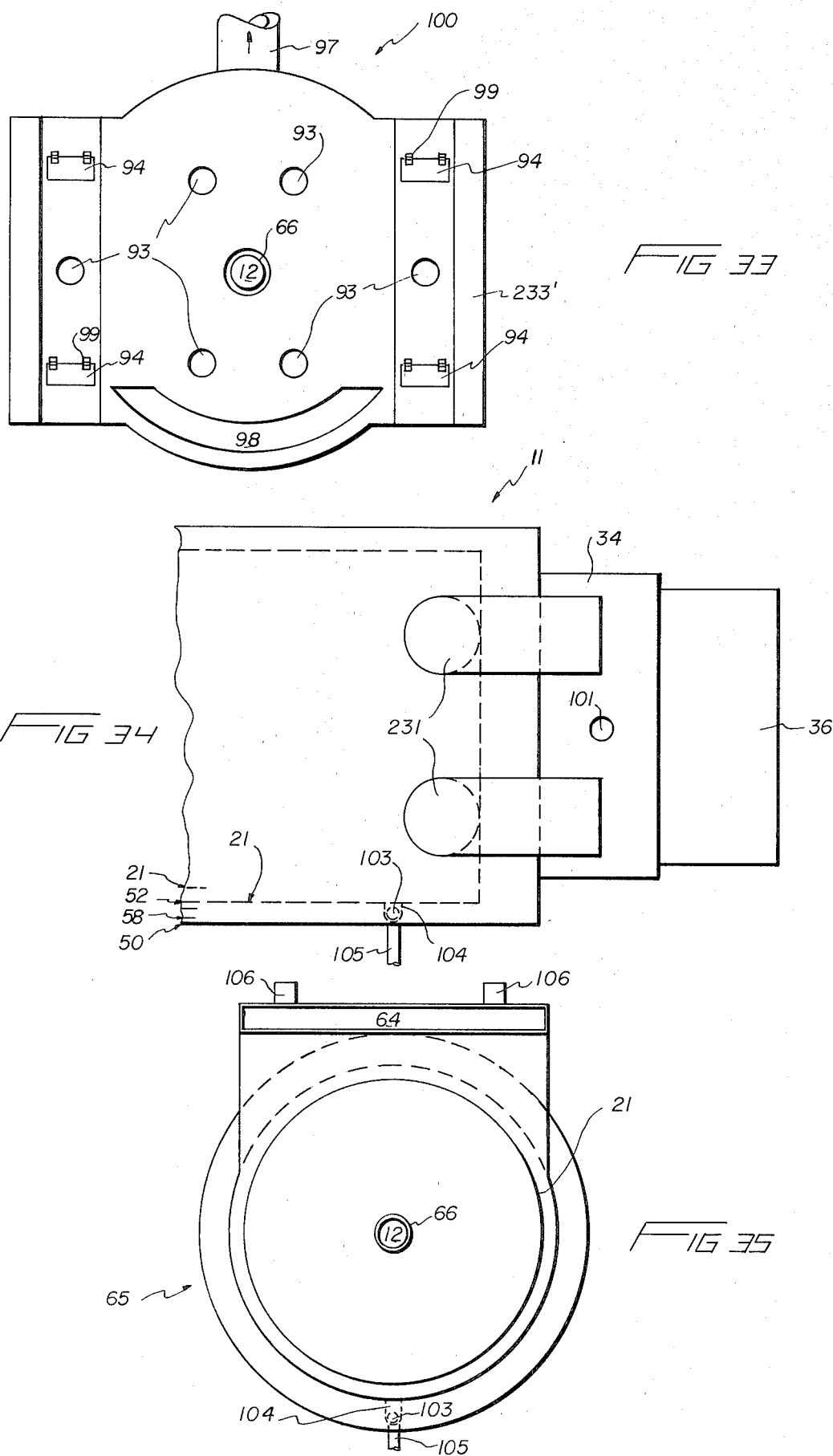

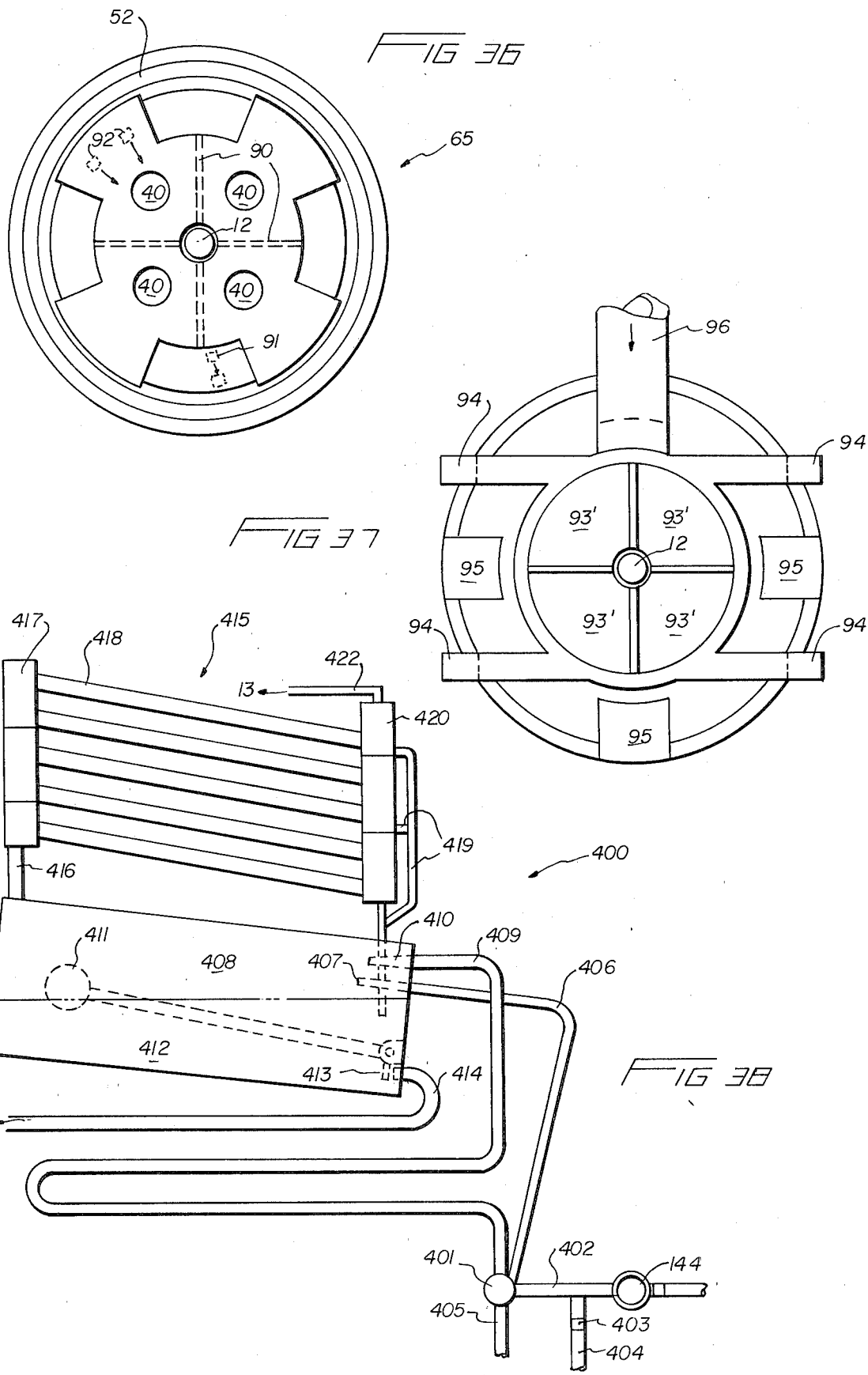

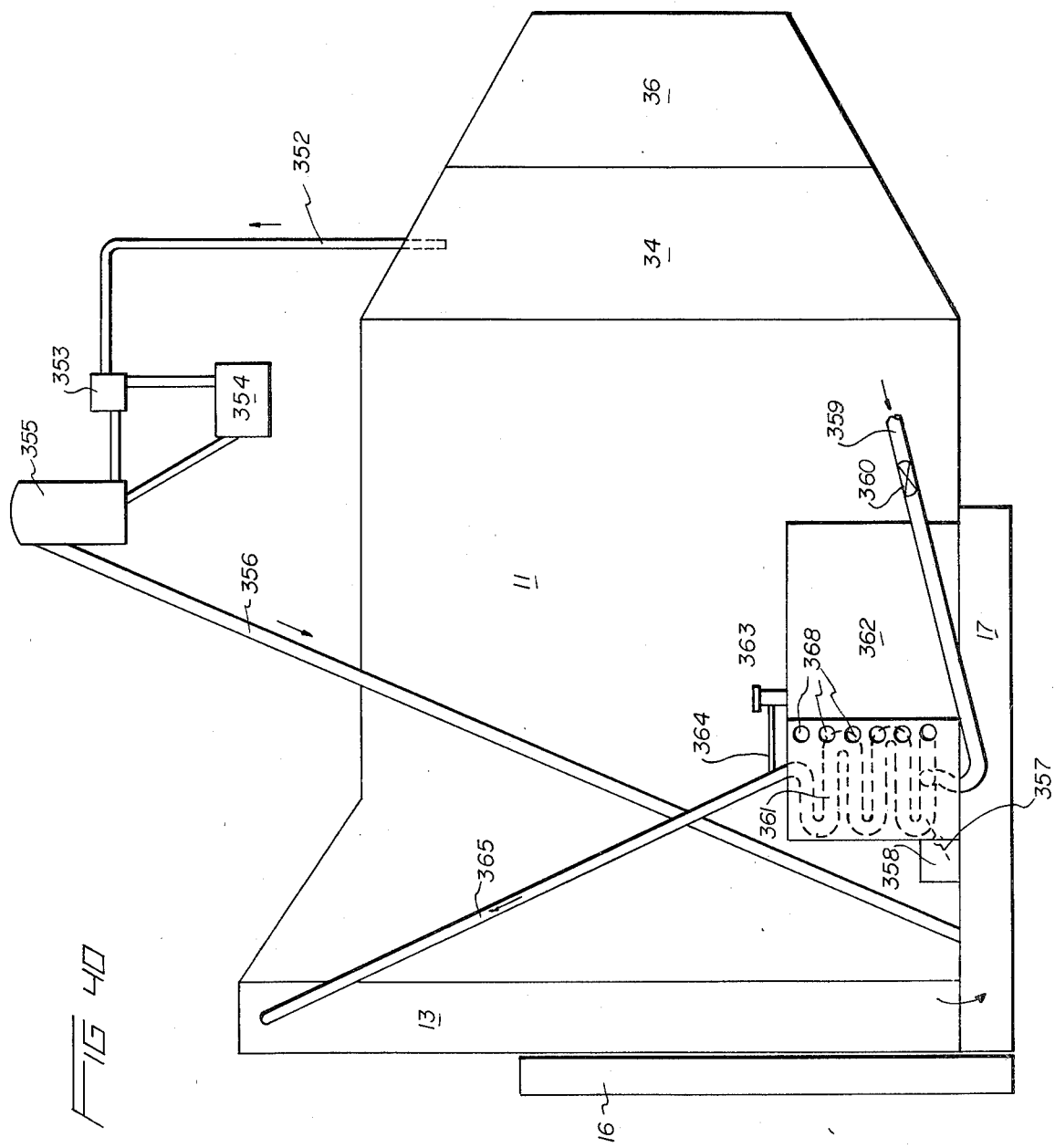

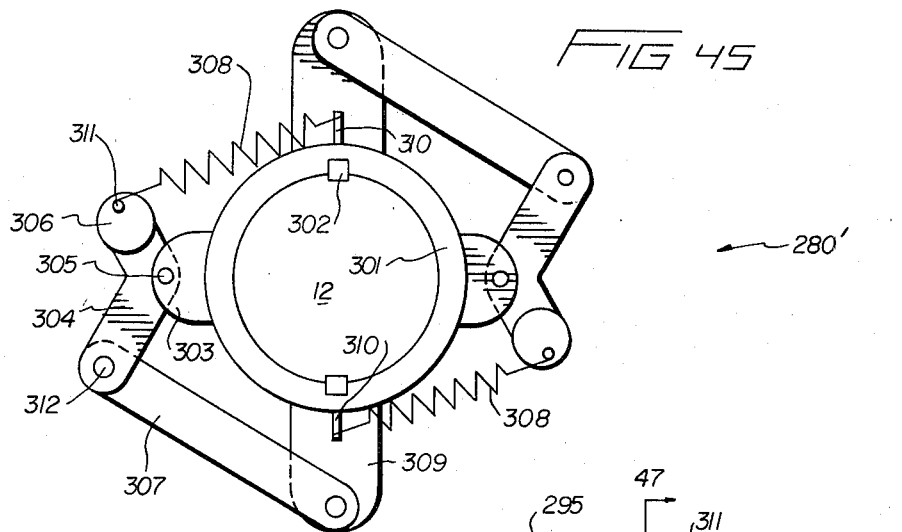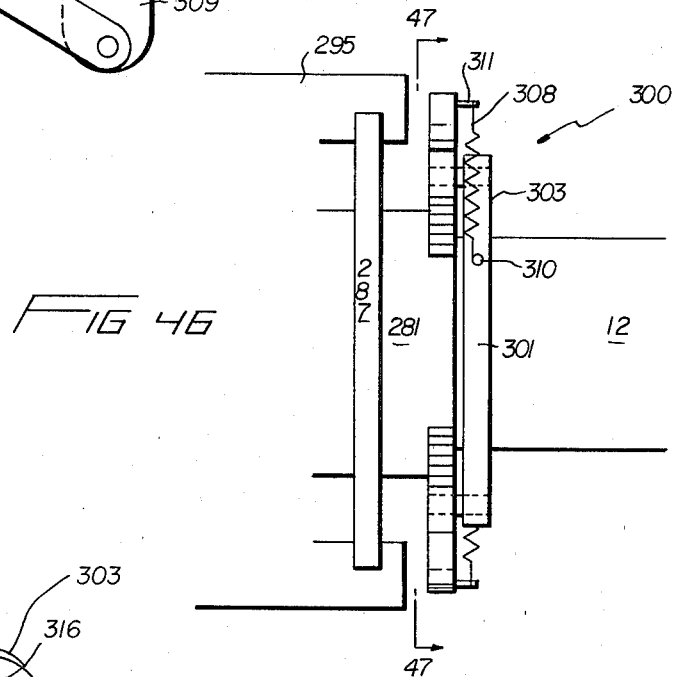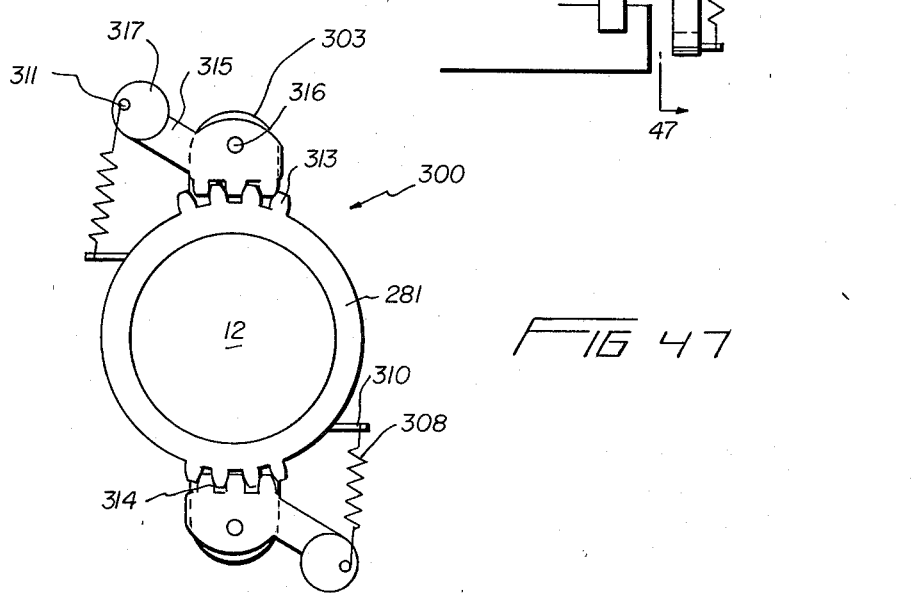

UNITARY STEAM ENGINE

BACKGROUND OF THE INVENTION

One of the earliest types of engines for performing work such as driving a load is the steam engine and at one time virtually all such engines were steam driven. While such steam engines performed satisfactorily in spite of their relatively low efficiency, subsequent developments in engine design produced engines of greater efficiency and higher horsepower to weight ratios such as the internal combustion engine, the steam turbine and the like. As a result, the use of steam engines became more and more rare so that today one seldom sees steam engines of these earlier types.

With the development of the motor vehicle, efforts were made to incorporate such a steam engine as the power unit for the vehicle but such efforts were short lived due to a number of difficulties and thus the internal combustion engine rapidly became the accepted power unit for the motor vehicle. As a result of such widespread acceptance for the internal combustion engine or gas turbine engine the steam engine as a power unit has been virtually eliminated from industrial and transportation use. Accompanying such lack of interest in the steam engine was the bringing of research and development of steam engines to a virtual stand still. However, there has been a renewed interest in steam engines as a result primarily of environmental and pollution considerations and from the continuing rise in the price of fossil fuels such as oil.

The following patents are representative of the prior art to which the subject invention pertains all of which are clearly distinguishable both structurally and functionally from applicant's steam engine:

1,160,445 Patitz, 2,295,962 Mueller, 1,440,623 Parente, 2,730,996 Doble, 1,690,129 Nielebock, 3,995,531 Zibrun, 1,962,986 Dole.

The steam engines described in the prior art patents listed above incorporate some elements which are similar in construction to some of the elements of the subject invention. However, none of these prior art engines disclose the specific new and novel combination of elements by means of which the new and unexpected results are obtained in accordance with applicant's invention.

OBJECTS AND SUMMARY OF THE INVENTION

Accordingly, a primary object of this invention is to provide a new and novel steam engine of the condensing type which is ideally suited as a power unit for a motor vehicle prime mover or the like. The term steam is used in reference to vapor characteristics, other liquids which produce usable vapor pressure are also contemplated.

Another object of this invention is to provide a new and novel unitary steam engine which may be operated at a high level of efficiency and which utilizes steam to high expansion with low thermal loss.

A further object of this invention is to provide a new and novel unitary steam engine which is of extremely compact construction, provides a highly favorable power to weight ratio and which is extremely quiet in operation.

Still another object of this invention is to provide a new and novel unitary steam engine which is substantially nonpolluting, which requires a minimum of maintenance, which may be produced at low cost and a high rate of production, and is easy to service.

A still further object of this invention is to provide a new and novel unitary steam engine which may be adapted for use with a variety of fuels and/or heat sources and which provides for engine braking power and utilizes the principle of direct conversion of heat energy to motive power.

A further object of this invention is to provide an engine which effectively separates steam and lubricant, keeping the steam pure and dry while at the same time providing adequate lubrication where needed.

Still another object of this invention is to provide very little valve clearance space in order to reduce dead waste space and to be able to better utilize high ratios of expansion.

Also, an object of this invention is to provide high flow rates for steam in order to facilitate high piston speeds and high rotative speeds.

Another object of this invention is to keep compression to a minimum by incorporating a novel means of valve movements, allowing almost total exhaust during exhaust stroke.

A still further object of this invention is to divide piston loads to achieve the best over all advantage.

Another object of this invention is to provide an engine with excellent balance of reciprocating elements and balance of forces applied to the crank shaft.

Another object of this invention is to produce a unit which possesses great intrinsic strength and rigidity.

Yet another object of this invention is to provide a system in which the caloric content of the fuel is used to a high extent with little loss.

Another object of this invention is to utilize exhaust steam heat which is normally discarded to improve the steam cycle efficiency and furnace efficiency.

Another object of this invention is to incorporate within the structure a regenerative feed water heat pump to aid in improving the steam cycle.

Another object of this invention is to provide for a simple automatic control for the functions of the furnace and boiler.

Another object of this invention is to provide means of giving the engine high overload capacities both automatically and manually.

Another object of the invention is to incorporate a means to produce distilled make-up feed water.

Another object of this invention is to provide means for additional deaerating of the system.

The objects stated above and other related objects are accomplished by providing a casing having a source of fuel therein together with an enclosure including a furnace for burning the fuel to create hot combustion gases with a plurality of coaxially arranged tubular partitions of circular cross-sectional shape surrounding the furnace. The tubular partitions define a plurality of radially spaced annular chambers, and an axially extending drive shaft is rotatably mounted within a central passage provided within the enclosure, the drive shaft having an end portion extending outwardly from the casing for driving connection to an associated unit to be driven. A plurality of annularly arranged boiler tubes are provided in a first one of the annular chambers over which hot combustion gases from the furnace flow and means are provided for circulating from a source of water in the casing through the boiler tubes for generating steam. A plurality of cylinder/piston assemblies are mounted in the casing, the pistons of which are drivably connected to the drive shaft and means are provided including a throttle and a plurality of slide valves each operatively associated with one of the cylinder/piston assemblies to conduct the generated steam to the cylinder/piston assemblies for reciprocating said piston to rotate the drive shaft. Cam means are provided on the drive shaft for actuating the slide valves in a timed relationship and means including a condenser are provided for converting the steam exhausted from the cylinder/piston assemblies into condensate and means are provided for returning the condensate to the boiler tubes in a closed system.

Other objects and advantages will become apparent in the following specification when considered in light of the attached drawings.

BRIEF DESCRIPTION OF THE DRAWING FIGURES

FIG. 3 is an enlarged longitudinal section view of a portion of the steam engine of FIG. 10;

FIG. 4 is an end view of a portion of the engine of FIG. 2 illustrating the disposition of the cylinder/piston assemblies incorporated therein;

FIG. 5 is a schematic showing of a modification of the driving arrangement of FIG. 4;

FIG. 6 is a schematic showing of another modification of the driving arrangement of FIG. 4;

FIG. 7 is a schematic showing of a further modification of the driving arrangement of FIG. 4;

FIG. 8 is a schematic showing of a modification of the pressure stages of the invention and admitting of additional crank pin positions, as at 90°;

FIG. 9 is a view similar to FIG. 8 showing schematically another modification of the pressure stages of the invention and admitting of additional crank pin positions, as at 90°;

FIG. 12 is an end view illustrating a cam actuating arrangement for the slide valves incorporated in the invention;

FIG. 13 is a view similar to FIG. 12 showing another cam actuator;

FIG. 14 is a view similar to FIG. 13 showing another cam actuator;

FIG. 15 is an end view illustrating a portion of the high pressure valve cam advance utilized in a valve cam mechanism assembly incorporated in the invention;

FIG. 16 is a view similar to FIG. 15 illustrating another portion of the high pressure valve cam of FIG. 15;

FIG. 17 is a view similar to FIG. 15 showing still another portion of the cam of FIG. 15;

FIG. 18 is a side view of the valve cam mechanism assembly and injection cam advance incorporated in the engine of the invention;

FIG. 21 is a side view of the high pressure slide valve head assembly incorporated in the invention;

FIG. 22 is a sectional plan view taken substantially along lines 22—22 of FIG. 21 in the direction of the arrows;

FIG. 23 is a sectional plan view of another slide valve assembly incorporated in the steam engine of the invention;

FIG. 24 is a sectional view taken substantially along lines 24—24 of FIG. 23 in the direction of the arrows;

FIG. 27 is a plan view of the throttle valve incorporated in the steam engine of the invention;

FIG. 28 is a sectional side view taken substantially along lines 28—28 of FIG. 27 in the direction of the arrows;

FIG. 30 is a side elevation view partially in section of the controller incorporated in the invention;

FIG. 31 is a perspective view of the steam separator incorporated in the invention;

FIG. 32 is a longitudinal sectional view taken substantially along lines 32—32 of FIG. 29 in the direction of the arrows showing one of four furnace areas;

FIG. 33 is an end view of the engine cover incorporated in the steam engine of the invention;

FIG. 34 is a side view of a high pressure steam injection port and low pressure steam exhaust ducting;

FIG. 35 is an end view of the portion of the front furnace cover shown in FIG. 29;

FIG. 36 is an internal section end view of the front cover incorporated in the boiler furnace of FIG. 29;

FIG. 37 is an end view of another portion of the rear cover for the boiler furnace of FIGS. 29 and 34;

FIG. 38 is a side elevation view of the deaerator incorporated in the steam engine of the invention;

FIG. 40 is a side elevation view similar to FIG. 2 illustrating a portion of the steam engine of the invention along with the make-up water system;

FIG. 41 is a view of another cam actuating mechanism for a slide valve incorporated in the invention;

FIG. 42 is a view similar to FIG. 15 showing another portion of the cam incorporated in the high pressure valve cam mechanism of the invention;

FIG. 45 is an end view of an automatic advance mechanism incorporated in the steam engine of the invention;

FIG. 46 is a side elevation view of a further type of automatic advance mechanism incorporated in the invention; and FIG. 47 is an end view taken substantially along lines 47—47 of FIG. 46 in the direction of the arrows.

DESCRIPTION OF THE PREFERRED EMBODIMENTS

Figure 2:
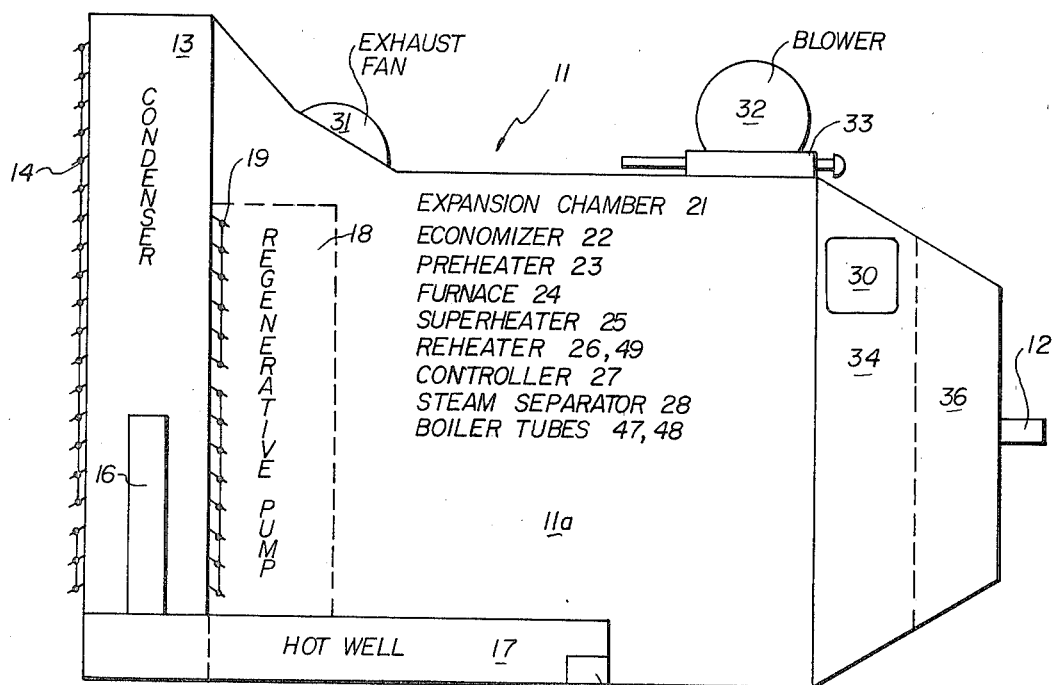
FIG. 2 is a side elevation view of the steam engine of the invention with the disposition of the parts identified therein.

The various component parts of applicant's steam engine all of which are compactly arranged within the casing 11 have been identified generally in FIG. 2 with reference numerals specifically identifying each of these parts generally. Beginning at the left in FIG. 2 the invention includes a condenser 13 having louvers 14 and 19 associated therewith and a vacuum pump 16 below which a source of water or hot well 17 is disposed. The louvers 14 are ganged in three sets and the louvers 19 are ganged in two sets. These sets of louvers are operated in separate stages according to cooling requirements as determined by a heat sensor, such as a multiple contact thermostat, located in the vicinity of the lower portion of the condenser. The function of the louvers is to control cooling air volume and direction of flow, such as, straight through, or in through a lower section in the front and out of an upper section in the back, or in at the bottom at the front and out at the top in the back. This is to protect the condenser from super cooling and to help retain additional heat in the system. A regenerative pump 18 is also disposed within the casing 11 together with an expansion chamber 21, economizer 22, preheater 23, furnace 24, superheater 25, reheater 26 and 49, controller 27, boiler tubes 47, 48 and steam separator 28. All of the components 18-28 are contained within the central portion 11a of the casing 11. Also, the casing 11 has supported thereon an exhaust fan 31 and a blower 32 and throttle 33 for regulating steam and therefore the speed of the shaft 12. On the righthand side of the casing 11, is provided a cylinder/piston crank section 34 and a valve cam operator section 36.

Figure 29:
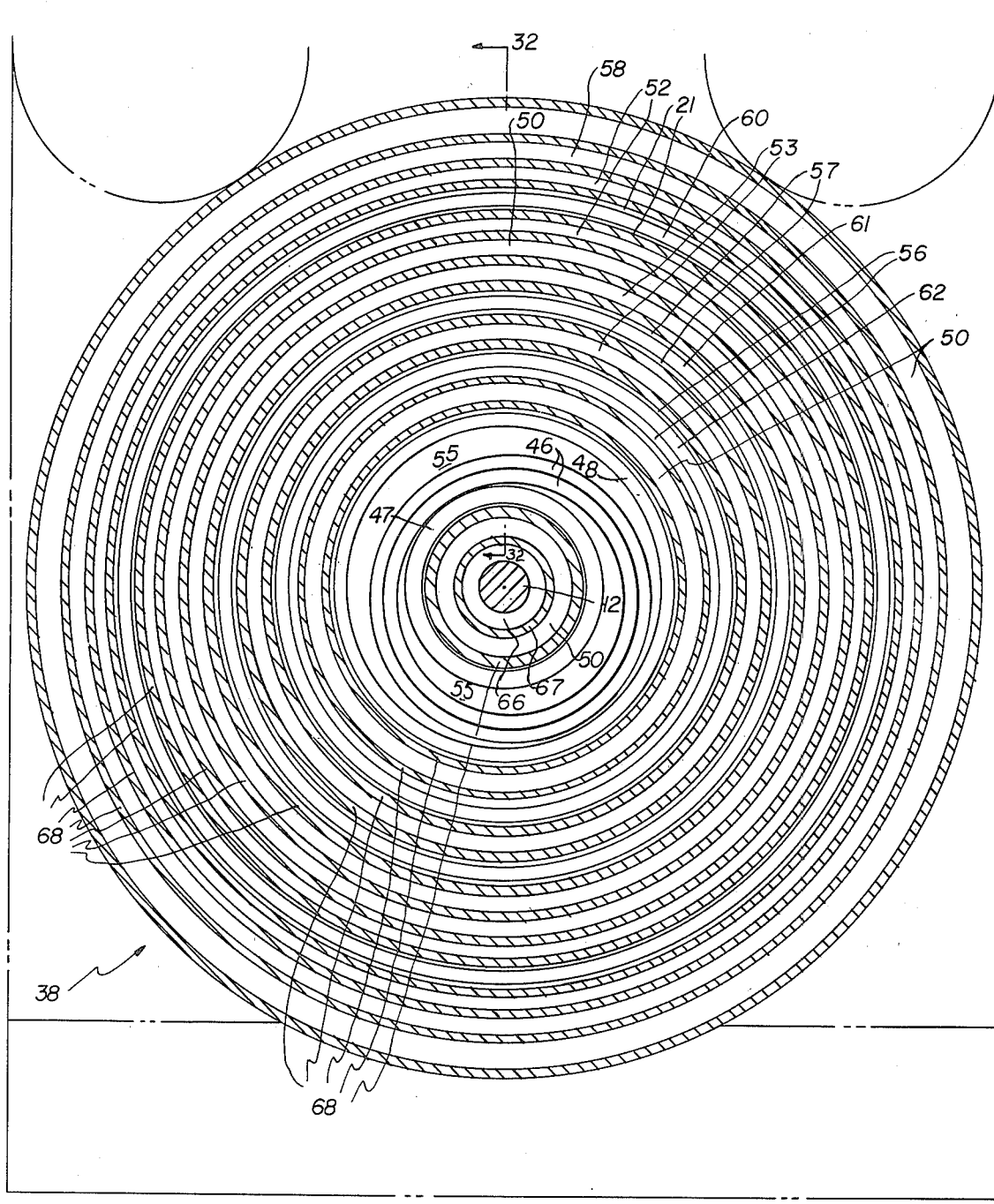
FIG. 29 is a sectional end view of the furnace and surrounding parts incorporated in the steam engine of the invention.

Referring now to FIGS. 29, 32 there is shown the furnace 24 of the invention having plural boiler tubes arranged therein and including an enclosure 38 of cylindrical shape, FIG. 29 illustrating a cross section of the enclosure 38 transverse to the shaft 12 and FIG. 32 illustrating a longitudinal radial section of the enclosure along lines 32-32 of FIG. 29. Most specifically, the enclosure 38 as shown in FIG. 32 reveals an outer casing having a forward end 65 including a doubled walled insulative shield 50, the innermost portion of which houses the furnace proper 24 and its associated hardware. Air is admitted through a filter 51 into the enclosure 38 via inlet ports 52 which are at radial extremities from the furnace 24. Traveling through a tortuous path the incoming air passes through the inlets 52, picking up heat from exhaust steam 64 and from final furnace exhaust 58, and when it reaches the righthand extremity of the path as shown in FIG. 32, the air is directed without the enclosure 38 and through the engine cover, cooling the crankcase and thence to the blower. Thereafter, the air is readmitted through the blower through passageways 53 as shown in the drawing, all the while picking up heat from the furnace operation so that the air which addresses the furnace 24 is heated. The quantum of air allowed in the furnace is controlled by dampers 40 which restrict the air inlet 54, and directly forward the damper, a burner 41 is provided which is surrounded by a converging nozzle 42. Thereafter, upper and lower baffles 43 control and direct the flame pattern so that passing beyond the narrowest point of the walls 43 the flame pattern is encouraged to take a substantially cylindrical path through conduit 44. Thereafter, the flame encounters a deflector 45 which provides an additional barrier for two rows of superheating coils 46. These coils run the length the enclosure. Directly therebelow, boiler coils 47 are provided and upwardly from the superheating coils, further boiler coils 48 are provided so that maximum extraction of the heat caused by the furnace is allowed to be absorbed in water carried within these coils. The hot exhaust gases pass beyond the furnace heat sensor controller 27' as shown in FIG. 32, the function of which is to sense the temperature of the boiler-furnace area so as to shut down combustion by closing a valve in fuel line 63 when necessary. The exhaust gases pass through the baffle structure defined by the boiler tubes and superheating tubes, and exit rearwardly so that the hot exhaust gases pass to and from the engine, the preheater, and the economizer. Moreover, the baffle structure as shown encourages heated gas to encounter the reheater denoted by a plurality of tubes 49 and 26, the function of the reheater 49 and 26 to be explained hereinafter as well. The exhaust gases are allowed to migrate radially outwardly after traversing the length of the enclosure 38, while constrained to pass into the passageway 56 which provides heat exchange relationship between further water conduit 62 to the exhaust gas in passageway 56. It is to be noted that the boiler tubes 48 are separated from these exhaust gases in a preferred form by means of an insulative shroud 50 as shown in the drawing figure. Thereafter, the exhaust gases are allowed to migrate into a further outwardly radiating strata 57 to preheat water contained in the tubes 61 as shown for additional heat transfer. Lastly, the furnace exhaust is directed to a further radially outwardly extending passageway 58 where additional caloric energy is extracted, thence outwardly through a damper equipped furnace exhaust conduit 59. In some environments, especially very hot climates, it is desirable to exclude the final exhaust passageway 58 and conduit 59 by opening an alternate exhaust conduit damper in exhaust conduit 59' while closing the exhaust conduit damper in exhaust conduit 59 so that exhaust gases will not traverse passageway 58. As shown in FIG. 29, the drive shaft 12 is centrally disposed within the cylindrical enclosure which includes the furnace and the boiler, the drive shaft being separated from the furnace area by means firstly of an air space 66 followed by a protective sleeve 67, thereafter insulation 50. In use and operation, the water conduits 60, 61, and 62 have water contained therein which gets progressively hotter as it migrates closer to the furnace area. The area of most intense heat of course would be the boilers 47, 48 and the superheaters 46 which thereafter reduce water to superheated steam to be directed to the engine. Final engine exhaust steam is caused to migrate for further use through the expansion chamber 21 which provides one last heat transfer through water containing conduits 60 and incoming air passageway 52. Steam being directed through this last passageway yields its benefits by means of coaction within the expansion chamber 21 to be defined hereinafter. Reference numeral 63 denotes a pair of fuel lines in which it is desired to preheat the fuel prior to combustion, and so it is placed in proximate relation to the outgoing steam to bring about this end.

While FIG. 32 has a counterpart below the shaft 12, it is not precisely a mirror image as seen in FIG. 29. Specifically, the superheating tubes 46 are eccentrically disposed relative to the drive shaft 12 so that there are areas closer to the axis and areas that are further away.

While the enclosure 38 has been described heretofore in terms of the passageways, it should be noted that each passageway is isolated from adjacent areas so as to exclude the unwanted mixing of different components. The cylindrical enclosure 38 takes substantially the form of a plurality of concentric annular cylinders 68 all of which include radially extending wall partitions 69 (FIG. 32 lefthand and righthand side) so as to form the passageways as defined supra. Note however that should it be desirable, the fuel leading to the burner of the furnace can be preheated by means of tubes 63 dedicated to the fuel lines.

Figure 1:
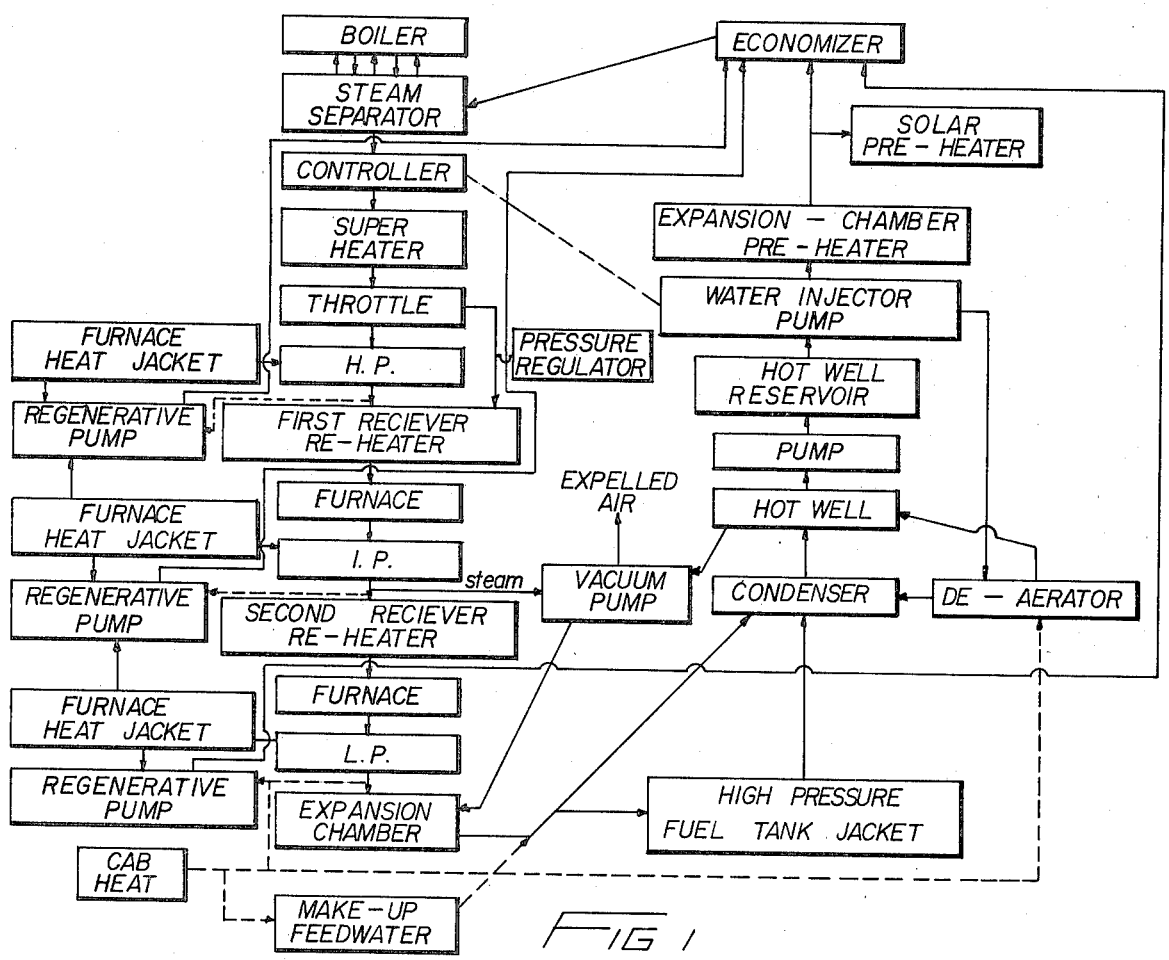
FIG. 1 is a flow chart illustrating the interconnection of the various components of the invention so as to reflect their sequential operation.
Figure 10:
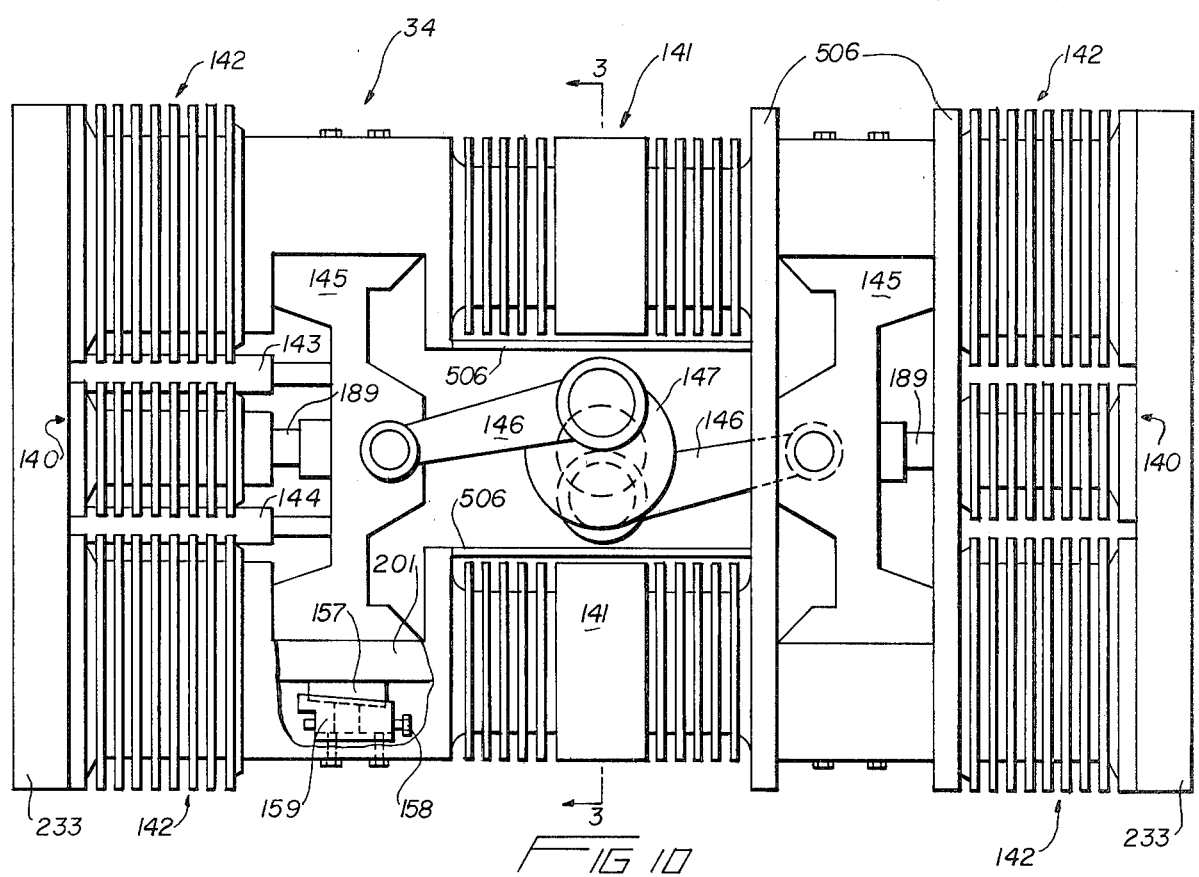
FIG. 10 is a view similar to FIG. 4 showing a modified arrangement for the cylinder/piston assemblies of the invention.

FIG. 30 teaches a preferred form of the controller which is disposed within the enclosure 11, the purpose of which is to assure that there is an abundance of liquid to be heated within the boiler, and to assure that should a malfunction of some nature occur, the furnace will be turned off. Specifically, a container 70 is provided which serves as a throughput between boiler tube 47 and superheater tube 46. The upper portion of the container 70 forms a steam chamber. Within the container 70, a plurality of electrodes 71, 72, 73 etc. are provided which are sensitive to the liquid level therewithin. The shortest of the electrodes 71 will cause a solenoid to move which operates a valve that controls the disposition of feed water relative to a water injector pump 144 (FIG. 10). Should the liquid level fall to the middle electrode 72, the solenoid valve causes the pump 144 (FIG. 10) to induce more liquid within the container 70. Should the system run out of liquid, in such a manner that the lowest electrode is activated, the fuel line 63 which delivers fuel to the burner(s) is shut off thereby preventing overheating. Steam generated in the boiler provides a pressure head so that a piston 74 disposed within a cylinder 75 at a lower end of the controller container 70 will move laterally to the left or right against spring 78 through connecting rod 76 in response to the pressure head. The cylinder 75 has a pressure bleed line 21a connected to the expansion chamber 21, behind piston 74. Disposed on the connecting rod 76 at an end remote from the piston, there is a slide valve 77 which occludes some or all of the fuel throughput lines. Specifically, a fuel inlet 63 communicates with a second cylinder 82 through which the connecting rod 76 passes so that the slide valve 77 will allow access to one or more fuel lines 79 each of which is directed to a different furnace burner. Therefore, the amount of fuel available to the different furnace burners can be controlled as a function of the steam pressure within the boiler. Moreover, the connecting rod 76 has fastened thereon a wiper arm 83 shown to be of L-shaped configuration, a top extremity of the wiper arm being operatively connected to a plurality of micro switches contained within area 81 which controls the speed of the air blowers 32 as will be described hereinafter. The lowermost leg of the L-shaped wiper arm 83 is provided with a contact area for further micro switches 80 which serve to control the air flow dampers 40 to provide an additional constraint upon the furnace. In this manner, the air fuel ratio is automatically adjusted based on the pressure head of the boiler. It is contemplated that at all times an equilibrium is desired in the controller 70 so that steam is in the topmost area proximate to 46, and a liquid level is in the bottom portion, thereby providing the pressure head. Clearly, when there is reduced pressure in the controller 70, the piston 74 will translate to the right thereby affecting the dampers 40, air blowers 32 and fuel outlets 79 as mentioned above. Also, it should be noted that upon initialization, when the water is cold, the piston is to the extreme right and therefore all four lines 79 of fuel are open. In order to make the response to pressure changes more sensitive, a muliplier may be incorporated. Mechanically, a lever is so pivoted that a small movement of the pressure sensitive piston 74 results in a large movement of the control end of the level. The fuel valve and micro switches are responsive to this magnified movement. Hydraulically the same effect is accomplished if the pressure sensitive cylinder moves a large hydraulic master cylinder, which in turn causes a magnified movement on a small slave cylinder. The same effect can also be achieved electronically. Attention is directed to FIG. 1 in which the controller is shown with a dashed line extending from the controller to the water injector pump 144 (FIG. 10) so as to extract water from a hot well reservoir 17 and maintain an appropriate liquid level in the controller 27. Because the hot well 17 is lower than the water injector pump 144 and incorporates a vacuum therein, a suitable small lifting pump 29 is employed at the underside of the hot well to impell water to an elevated gravity feed secondary reservoir 30 above the water pump 144 to supply liquid to the water injector pump 144. Attention is also directed to FIG. 1 in which a steam separator 28 is shown schematically and depicted graphically in FIG. 31 which will now be discussed.

The steam separator 28 is an adjunct to the boiler in which the tubes 62, 47, 48 of the separate stages have interposed therebetween a manifold 84 so that when liquid passes through these tubes, any steam contained therein will gravitate upwardly through the manifold 84 defined as a plurality of upstanding pipes 85 all of which communicate with a central conduit 86 having an outlet 87 as shown. Steam is directed from the outlet 87 to the superheater 46.

FIG. 36 depicts a typical front cover for the boiler/furnace and the cylindrical housing 38, and bears the reference numeral 65 generally. From FIG. 36, it is clear that there are four burners and dampers and the illustration in FIG. 32 is for one quadrant. Accordingly, the four dampers bear the reference numeral 40, the support braces between the various quandrants bear the reference numeral 90, and as shown, reference numeral 52 depicts the fresh air inlet, reference numeral 12 the drive shaft. Reference 91 depicts the egress of furnace exhaust from chamber 56 to 57 as shown in FIG. 32, and reference 92 depicts the ingress of air from the second preheat stage (53) into the furnace itself through passageway 54. Attention is also directed to FIG. 37 wherein reference numeral 93' is directed to ducts 93 FIG. 33 at the rear or end portion 100 of the furnace area which is suitably formed to direct the furnace gases alternatively either to the engine and/or to the first exhaust conduit 56 as shown in FIG. 32. The purpose of directing it to the engine of course would be for continual cylinder heating sometimes refered to as jacketing. Thereafter, the gases return from the engine and are dumped directly into the first exhaust through portals and conduits 94. The reference numeral 95 is directed to a conduit which extends from the second furnace exhaust chamber or passageway 57 to the final exhaust conduit 58. Reference numeral 96 refers to preheated air which has come from the inlet 52 and before passing into the second stage of heating, is passed through the blower 32 via conduits 96 and 97 as shown in FIGS. 32, 33, 37, and 2. In this way, the blower air has been given a first heat prior to subsequent heating for the furnace use.

FIG. 33 shows a specific form for directing the air and diverting the furnace exhaust gases shown in FIG. 32. As shown, the chamber 100 which separates and controls the furnace exhaust gas and air migration communicates with a blower intake duct 97 via integral chamber 66, 52 (FIG. 3) and which in turn communicates with the blower 32. Specifically, the cooling air 66 which insulates the drive shaft 12 combines with the first preheated air 98, 52 to migrate within the duct 97. Thereafter as shown in FIG. 37, air is discharged from the blower through conduit 96 back into the passageway 53 of FIG. 32. The plurality of ducts 93 directs the furnace gas emanating from passageway 55 (FIG. 32) into the engine area to heat the cylinders as was touched on earlier. The ducts 93 are further communicating on return from the engine with offset conduit 94 shown as substantially rectangular in configuration (FIG. 33) provided with a flap door 99 being thermally hinged whereby when the engine operating temperature is at a desired level, the furnace gas in chamber 55 is diverted up into the furnace exhaust passageway 56 as shown schematically in FIG. 32. Additionally, the furnace exhaust gases which are used to heat these cylinders after passage through the engine compartment are additionally delivered to the furnace exhaust conduit 56 for further heat exchange benefits with the incoming air and boiler tubes 62 etc. In FIG. 34 as in FIG. 2 reference numeral 36 is directed to a valve cam operator section to be discussed at a later time. FIG. 34 is a side view of the initial high pressure steam injection 101 and final steam exhaust network 231 in which the steam injection passes into the engine compartment 34 from the boiler/furnace, and first through the throttle 33. Thereafter, the steam that is spent from the engine is passed through the expansion chamber 21 and into the steam outlet 64 shown in FIG. 32 and FIG. 35. Specifically, FIGS. 34 and 35 are directed to the following structure:

The steam injection ports 101 extend from the throttle 33, and after the high pressure high temperature steam has been utilized, the steam is exhausted through exhaust network 231 into the expansion chamber 21. When encountering this increased volume, that portion of the exhaust steam flow which is saturated vapor will condense and run into a lower reservoir 104 encountering a float operated drain 105. A float 103 which is buoyant (given a certain liquid level) will rise allowing the condensed liquid to drain into the hot well shown in FIG. 2. The steam will flow upwardly in the expansion chamber 21 allowing communication with the exhaust steam outlet 64 shown in FIG. 32, and be directed to the condenser 13 which communicates with the hot well 17 for recycling. Should the pressure of the exhaust steam exceed a certain value, a pair of first and second relief valves 106 are provided to vent steam to the atmosphere. As shown in FIG. 32, the expansion chamber 21 serves to preheat incoming water contained within tubes 60 and incoming air in passageway 52 FIG. 32.

Up to now, we have been concerned with taking a liquid such as water and elevating its temperature to such a degree that usable steam has been provided. At this point, a discussion of the throttle mechanism (FIGS. 27, 28) wherein the steam is introduced into the engine compartment should now be discussed so as to provide a better understanding of how the steam is controlled for useful work. Thereafter, the engine mechanism itself will be covered.

Steam leaving the superheater tubes 46 of the furnace/boiler is admitted into the throttle 33 via inlet port 110 (FIG. 28). The inlet port 110 communicates with a metering cone 112 in such a manner that lateral translation of the cone to the left as drawn will increase the amount of steam admitted. The cone's lateral translation to the left will induce a greater flow of steam into the high pressure stage of the steam engine through outlets 113 which ultimately connect to the engine steam portals 101, FIG. 34. The metering cone 112 is operatively connected to a throttle stem 114 whose terminal portion outside of the throttle block 111 is provided with a throttle stem connector cap 125 connected through linkage to an accelator pedal commonly found in most vehicles. The throttle stem 114 has a portion forward of the metering cone 112 which passes into a throttle return mechanism defined by a return stem 126 extending outwardly from the tapered portion of the metering cone 112, and overlying return spring 127 constrained at front and rear extremities of the return stem by means of spacers 128, the spacer remote from the metering cone being fixed to the return stem by means of a retaining pin 129 and the other spacer abutting an end cap 131. The return mechanism is covered with a shroud 130 suitably affixed to the main throttle body by means of a stud 133 and a nut 134 in overlying engagement which affixes the end cap 131 to the throttle block 111. This fastening mechanism is somewhat similar to the lefthand portion where the throttle stem connecter cap 125 extends outwardly. An annular bleed groove 117 is provided around the metering cone as shown in FIG. 28 so that when the cone is disposed in the righthand position or nested against the block 111, a certain amount of steam will pass from the inlet 110 to the outlet 113 to allow the engine to operate at a minimum idling speed. Additionally, a pressure equalizing and bypass channel 116 is provided to allow seepage of a portion of the steam from the superheater and inlet 110 into a meter cone travel cavity 115. Balancing this equalization is a further groove 122 serving as a bypass channel in a direction opposite from the first mentioned channel 116 so that there is no unwanted back pressure retarding motion of the metering cone. The steam which enters into the metering cone travel cavity 115 engages a plug 119 threaded into the body block 111 of the throttle. Accordingly, it should be appreciated that as the throttle stem and therefore the metering cone translates to the left, a greater open area is provided for the steam that comes from the superheater to enter into the steam outlet 113. Additionally, if the metering cone and throttle stem are translated fully to the left, a passage 116 between the throttle stem 114 and the plug 119 is provided and the steam then resides in a bypass cavity 135 whence it migrates through a bypass line 118 to the first (intermediate pressure) receiver 26. The receiver will be discussed hereinafter.

Steam escaping further rearwardly between the throttle stem 114 and a plurality of seals 124 is thereafter terminated in a further pressure bleed-off spacer 120 which communicates with a pressure bleed-off which communicates via conduits 121 to a second (low pressure) receiver 49 also to be described hereinafter. A further seal 124 proximate to the end plate 131 and spaced therefrom by means of a spacer 132 is shown. Forward of the metering cone steam escaping past the seals 124 enters a second pressure bleed-off spacer 123 having an outlet 121 similar to that which has just been discussed. The end plate 131 is separated from the pressure bleed-off spacer 123 by means of a further seal 124 and spacer 132.

Attention is now directed to the engine 34 itself, one form of which is best shown in FIGS. 3 and 10. Steam leaving the throttle 33 through outlet 113 arrives at the steam injection port 101 as discussed hereinabove (FIGS. 21, 22, 28 and 34), and is adapted to be injected into a high pressure cylinder 140 through valve means to be discussed hereinafter. It is contemplated that the cylinders to be discussed hereinafter are single acting. The superheated steam expands and moves the piston contained within the cylinder. Thereafter, the steam which has expanded is exhausted through an exhaust valve to be discussed hereinafter, and in one form of the invention, the exhausted steam is directed immediately to an intermediate pressure piston cylinder combination 141. Similarly, the steam does work on the intermediate pressure cylinder, it being noted that the intermediate stage has a larger piston diameter than the high pressure stage, and the steam exhausted therefrom migrates through conduits to the low pressure stage 142. Clearly, a plurality of such stages can be ganged in this manner, each successive stage having a larger piston diameter for additional extraction of energy. FIGS. 3 and 10 indicate that the plurality of pistons are all operatively connected to a single crankshaft 147 of the drive shaft 12 through connecting rods 146, the connecting rods in turn being operatively connected to cross arms 145 suitably fashioned to gang together a plurality of pistons in such a timed relationship, that an efficient utilization of the steam occurs and work is done on the crankshaft 147 substantially at all times. FIG. 10 further depicts a fuel pump 143 operatively connected to the cross arm 145 so that work can be done thereon, and a water injection pump 144 is contemplated as being provided connected to the cross arm 145 whereby a valving arrangement as is well known in the art causes the moving plunger of the respective pump to circulate fuel and water as is desired. As is best shown in FIG. 3, the engine 34 is disposed adjacent the furnace/boiler in 11a and it should now be clear how the drive shaft cooling air 66 is vented back to the blower 32 as well as preheated air 52. As before, the insulation in the device bears the reference numeral 50, and similar reference numerals from FIG. 32 have been transferred. FIG. 3 shows the intermediate pressure cylinders 141. Also, the drive shaft 12 displays the crankshaft 147, and the righthand portion of the FIG. 3 indicates by reference numeral 150 that a cam surface is intended to be disposed upon the shaft, the configuration of which will be the subject of an ensuing description. The area 36 allows for the placement therein of various valve operators and push rod assemblies adapted to be operatively engaged with the cam surface on the portion 150 of the shaft 12. The upper corner of the drawing indicates a high pressure fuel storage tank 154 having a conduit 63 communicating with the fuel preheat area where it is preheated prior to combustion. The upper portion of the high pressure fuel tank 154 contains entrapped air while the lower portion contains liquid fuel supplied by a fuel storage tank and delivered by the fuel pump 143 via fuel line 137. The air exerts pressure on the fuel and as the volume of fuel in the container increases the pressure also increases until the pressure is great enough to force open a pressure relief valve 138 connected to the lower section of the high pressure fuel tank by an outlet tube 139. When the pressure relief valve 138 is forced open the excess fuel is returned to the fuel storage tank. Chamber 151 defines an oil reservoir having a downwardly curved sediment trap 152, and a petcock 153 to allow the changing of the oil, or the bleeding off of steam which has been liquefied and blown by rings disposed upon the pistons. A single oil return passageway 155 has been depicted, it being understood that with the exception of the steam valves, lubrication is necessary for all the moving parts and is supplied by an oil pump. A seal 156 is provided proximate to the air 66 which is removed away from the drive shaft 12 and onward to the blower 32, the seal 156 serving to isolate the sealed crank case compartment from any contamination. The righthand portion of the drive shaft 12 can harness any kind of work output. Additionally, it is contemplated that a flywheel be provided on the shaft 12 so that the incremental pulses of power caused by steam expansion will be smoothed out by virtue of the flywheel effect and provide a continuous output. Attention is directed to FIG. 10 in which a guide means 159 for the cross arms 145 is provided. Specifically, the face of an adjustable shoe 157 engages the piston rod 201 so that the reciprocal translation of the cross arm to the left and to the right as shown in FIG. 10 can be constrained from a waddling type of motion, the degree of penetration of the shoe 157 and its abutment to the piston rod is controlled by means of adjusting screw 158, which moves the shoe 157 relatively closer to the piston rod 201. Such guide 159 being typical for each piston rod 201. The piston rod 201 is solidly affixed to the cross arm 145.

Piston ring and cylinder wall lubrication is limited to the crank case side of the pistons with no lubrication being injected into the steam and the low friction short action valves acting against low friction seats without lubricant. The super heated steam and furnace heated cylinder walls mitigating the problem of hot condensate washing away cylinder lubricant.

Attention is now directed to FIG. 1 in which superheated steam from the throttle to the high pressure stage of the engine is shown thereafter as going to the first receiver reheater. This comprises a preferred form of the invention when contrasted with what has been discussed supra and while generally the steam can proceed directly to the intermediate pressure stage additional benefit is obtained by taking the exhaust steam from the high pressure stage and reheating it. To this end, the tubes in the righthand corner of FIG. 32 reflect the use of a first receiver reheater bearing the reference numeral 26, that being the smaller diameter pipes, and a second reheater is similarly provided with a larger diameter pipe 49. In addition, a portion of the steam from the throttle can be bypassed around the high pressure stage to combine in the reheater with steam exhausted from the high pressure stage. As is shown, the by-pass steam 118 (FIG. 27) extending from the throttle 33 to the reheater 26 passes through a pressure regulator 160 now to be defined.

Figure 26:
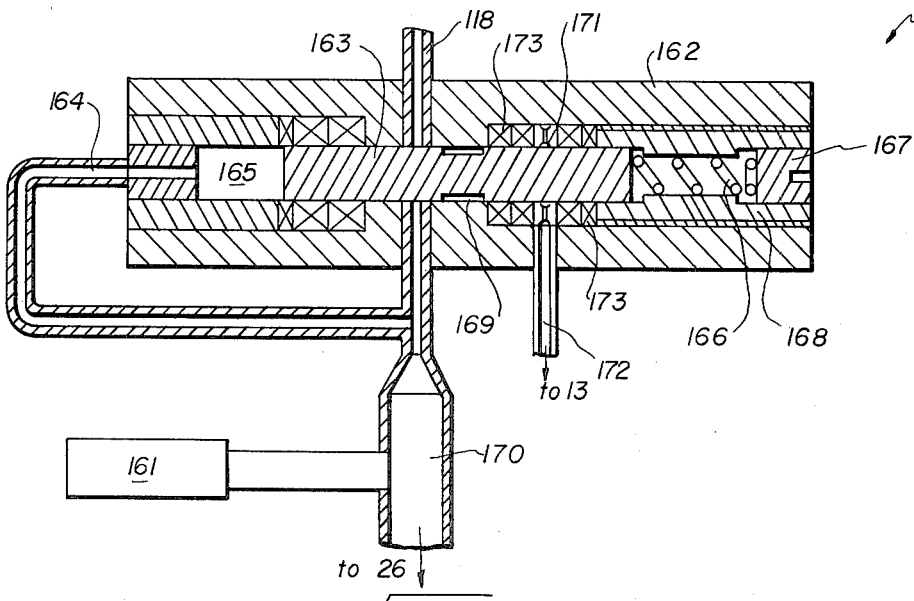
FIG. 26 is a sectional view of the receiver pressure regulator incorporated in the steam engine of the invention.

FIG. 26 teaches the use of a receiver pressure regulator 160 in which the bypass line 118 extending from the throttle goes through the regulator 160. The regulator includes a safety pressure release valve 161 of the pop off type; the operation is as follows. A regulator body 162 is provided with a slidable piston 163 which (towards the left) is responsive to pressure in the form of steam provided at line 164. Pressure in cavity 165 causes the piston slide 163 to translate laterally within the regulator body 162 against the biasing force of the spring 166, the magnitude of the resistance of the spring being alterable by the threaded insertion of plug 167 within the body. The plug 167 is threaded therewithin so as to alter the spring tension. A sleeve 168 is provided to serve as a housing for the spring and the plug, and the spring abuts against the piston 163 as shown. Should the pressure in line 164 diminish, the piston will translate laterally to the left providing a through put by means of the space 169 in the piston thereby allowing communication of conduit 118 and tube 170 that communicates with the first receiver reheater 26. In addition, a bleed off 171 is provided somewhat similar to that which was discussed for the throttle whereby steam migrating to the bleed off 171 is allowed to migrate away from the regulator body through conduit 172 and onward to the condenser 13 shown in FIG. 2. As with the throttle, seals 173 are provided to control the amount of steam migration to the condenser. Returning to FIG. 1, a portion of the steam leaving the first exhaust will be bled to a regenerative pump to be discussed hereinafter the remainder is routed to the furnace reheat area to further elevate the temperature of the steam so that maximum efficiency can be obtained when the steam is injected into the intermediate pressure stage 141 of FIG. 10. Similarly, a portion of the steam exhausted from the intermediate stage will be bled to the regenerative pump and the remainder will go to the second receiver reheater 49 (larger tubes); thereafter, back to the furnace and thence to the low pressure stage 142. A portion of the steam leaving the low pressure stage 142 is similarly bled to the regenerative pump and the remainder is transferred to the expansion chamber 21 as was discussed hereinbefore. Although not shown, a second pressure regulator may be desirably disposed between the throttle and the low pressure bleed off 121 prior to its admission into the second receiver reheater 49, similar to the above discussed pressure regulator 160.

A discussion of the valve mechanism for the steam engine appears to now be in order for a fuller understanding of this aspect. Attention is directed to FIGS. 21 and 22 which show the valve structure specific for the high pressure stage 140, the sectional view in FIG. 22 showing the valve in the exhaust stage. This same structural design also applies to the first intermediate stage 140' (FIG. 4) in quadruple expansion designs. On the power stroke, a cylinder 188 is in direct communication with the steam inlet 113 which extends from the throttle 33 through inlet 101 discussed above. In that mode, a valve 183 is translated laterally to the left so that the block portion 195 occludes the exhaust aperture 184 and allows steam passage from the steam inlet 113 into the cylinder 186. The valve 183 is capable of lateral translation as shown in FIG. 22 by means of coaction against a valve stem 176, the valve stem 176 translated along its axial length by virtue of a push rod motion to now be described. A valve stem cap 180 is provided on the lefthand side of the head 233 to provide clearance for the valve stem 176 and not allow any contamination within the valve mechanism itself from ambient conditions. First and second apertures 181, 182 (FIG. 21) are provided in the valve stem cap 180, the first 181 is a bleed off for excessive liquid, and the second 182 is an oil line to promote top end lubrication. The action of the push/pull rod 194 to translate the valve stem 176 laterally to the left is opposed by a spring 177 juxtaposed between a cylinder head 233 and a valve stem ball 191 which is formed on the end of the valve stem and resides against one end of an L-shaped rocker 190. The rocker 190 is pivoted at pivot 193 so that vertical motion of the push/pull rod 194 causes the rocker arm to toggle left to right, thereby biasing the valve and the valve stem as explained hereinabove. Releasing the pressure of the push/pull rod causes the valve stem to translate laterally to the right by virtue of the spring tension 177. An adjusting screw 192 is provided in proximate relationship to the ball end 191 so as to provide the capability of altering the clearance and therefore the valve backlash which may sometimes occur through wear and expansion. Interposed between the high pressure cylinder flange 178 and the head 233 is a low friction plate 179 which when properly fitted assures that the steam will not migrate between the interface of the head and the cylinder and will provide a good seal. As shown in the drawing, the passageway of the cylinder 186 communicates with the exhaust aperture 184 and therefore the exhaust outlet 185, so that the piston can return to top and center upon which time the valve will translate substantially laterally to the left, and steam entering from conduit 133 will provide a downward pulse for the piston 187. The valve block portion 195 is then moved to an intermediate position blocking both injection and exhaust ports so that steam can work expansively in the cylinder passageway 186 against the piston 187.

FIGS. 23 and 24 show the particulars for the intermediate pressure valves and piston assembly 141. Steam enters the intermediate pressure valving structure from the first receiver reheater 26 and furnace as shown in FIG. 1, and comes into an intake slide valve 224 through conduit 26, the first receiver/reheater. The steam conduit 26 terminates on an inlet head 225, and within the head area the inlet slide valve 224 is slidably positioned to selectively open or occlude the inlet valve portal 203. The inlet valve portal 203 communicates with the cylinder space 202, of the piston/cylinder assembly 141 FIG. 10; the admission of steam therein causes the pistons 200 to migrate laterally apart simultaneously and thereby move the piston rods 201 associated with each piston. The inlet slide valve 224 is capable of lateral displacement within the inlet head 225 by means of a valve stem 221 which operates against spring 222 pressure, the spring 222 being provided within a housing 223 having an opening therewithin for slidable insertion of the valve stem 221 against the pressure of the spring. The housing 223 also contains a pressure vent line 226 communicating with the condenser. The valve stem 221 is operated by means of a cam follower ear element 297 (FIG. 41) which coacts against a rocker arm 218 having a pivot 220 and an adjusting screw 219 so that a reciprocating oscillatory motion of the valve stem is provided. Steam is allowed to be exhausted from the cylinder space 202 by means of an exhaust port 204 which is selectively occluded by means of slide valve 205 operated by a similar valve stem 209. The movement of the exhaust valve 205 allows intermittent access between the exhaust port 204 and the exhaust exit chamber 207 which is operatively connected to the second receiver tubes 49 as shown in FIG. 24. Steam entering the second receiver 49 is directed to the reheat area of FIG. 32 for additional energy absorption which further heats the steam and thence onward to the low pressure section of the piston engine. Specifically, the slide valve 205 for the exhaust outlet is provided within an exhaust head 206 within which the valve stem 209 is slidably disposed and works under spring pressure, the spring 210 being carried within a spring housing 211 having a recess therein which accepts the exhaust valve stem end and having a pressure vent line 227 similar to the inlet valve. The valve stem 209 is provided with a ball and socket connection 216 to a rocker arm 214 pivotally connected at pivot 215 to a cam follower ear element 297 (FIG. 12), the connection area between the ear element and the rocker arm through adjusting screw 217. A pressure tube 212 communicates between the inlet valve area and the exhaust valve area to provide a pressure equalization so that the exhaust valve will be held firmly against its seat so as not to leak injection steam through. The exhaust valve area is provided with a steam trap 228 and condensate line 228' communicating with the hot well. Covers 229, 229' are provided as heat shields.

Figure 19:
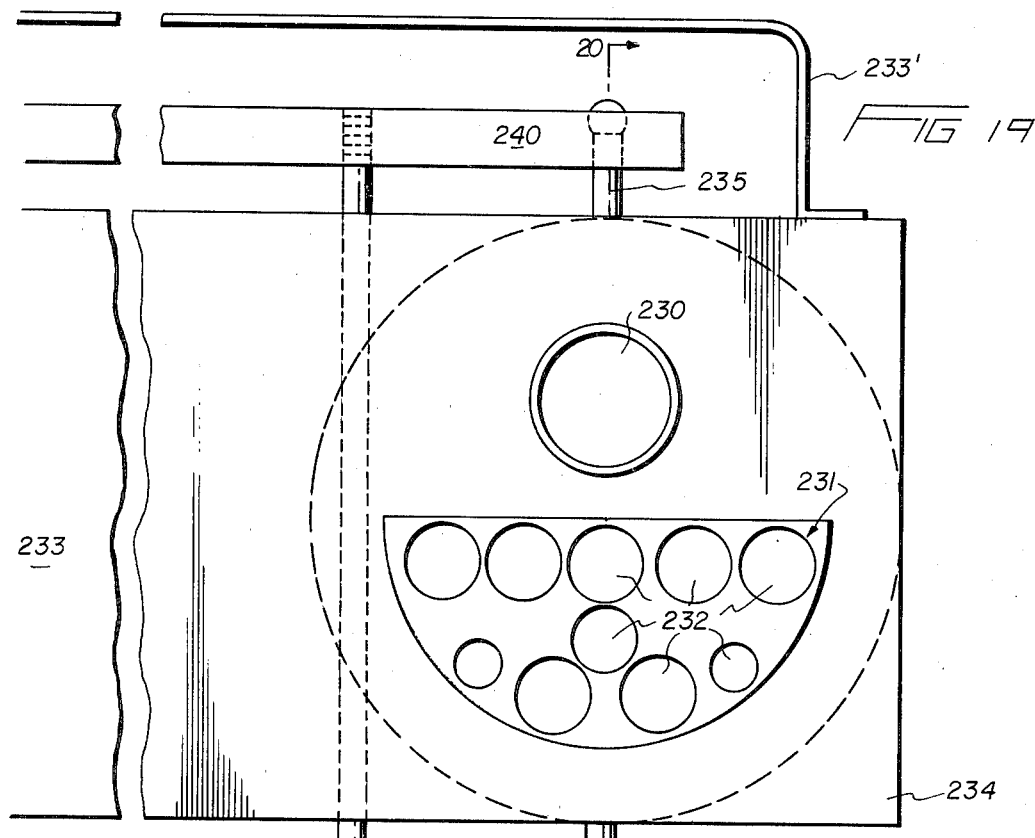
FIG. 19 is a side view of the low pressure slide valve head assembly incorporated in the invention.
Figure 20:
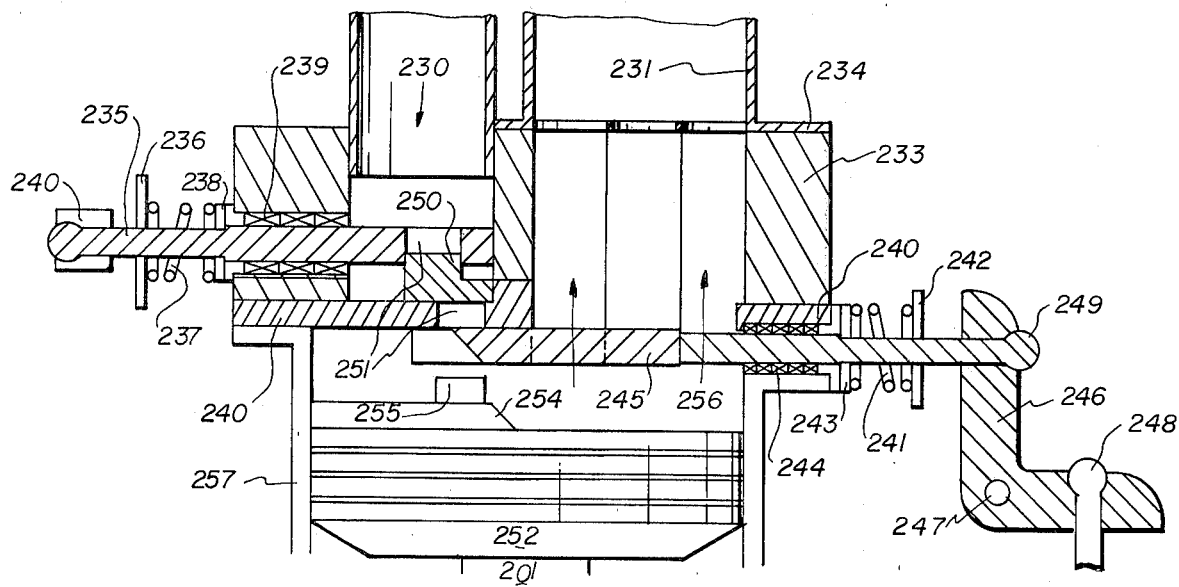
FIG. 20 is a sectional plan view of FIG. 19 taken substantially along lines 20—20 in the direction of the arrows.

FIGS. 19 and 20 are directed to the low pressure valving stages of the engine according to the present invention, in which FIG. 20 shows the valve in the exhaust stage. Specifically, an inlet 230 is provided in which steam from the second receiver reheater 49 of the furnace/boiler provides steam into the low pressure stage, the steam engaging inlet valve 250. When the valve 250 is translated to the left as best shown in FIG. 20, the inlet port 251 is in communication with the cylinder space 256 to allow admission therein of steam to allow the piston 252 to travel downwardly within the cylinder 257 thereby moving the piston rod 201. Similar to the previous valves, the low pressure stage 142 FIG. 10 has a valve stem 253 for moving the inlet valve 250, the valve stem 235 working through a seal 239 and against spring 237 pressure, the spring retained on opposed sides thereof by spacer plates 236 and 238. The valve stem 235 is operatively attached to a connecting bar 240 and thereafter to a transverse rod 258 thence to a further rocker 259 as best shown in FIG. 19 which is operated by push/pull rod 281 FIG. 13. The piston 252 has a unique contour on its top face when contrasted with the other pistons discussed supra and a step portion 254 is provided directly below the inlet area 251, the step portion including an upstanding rectangular block 255 to add additional efficiency in the expansion of steam in the cylinder by reducing valve clearance. As before, the exhaust valve 245 is operated by a valve stem 249 operatively connected to rocker 246 having a push/pull rod 248 about which pivotal action is caused through pivot pin 247. The valve stem 249 is biased against the action of the push/pull rod 248 by means of spiral spring 241 which is interposed between two retainer spacers 243 and 242. Similar to the intake valve, an exhaust sealing gasket 244 is provided where the valve stem passes through the cylinder flange. The valve plate 245 is provided with a beveled end proximate to the inlet port 251 directly above the step portion 254, 255 of the piston. The exhaust port 231 is comprised of a plurality of exhaust emitting orifices 232 best shown in FIG. 19. As shown in FIG. 20, the inlet 230 and exhaust tubes 231 are mounted on the head 233. The cylinder 257 is fastened to the head 233 through a spacer 240 made of appropriate low friction material. The exhaust duct includes an annular flange 234 to affix to the head 233.

An explanation of the push or pull rods is now called for. In order to reduce mass, conserve space, and reduce the number of cam lobes and follower plates the concept of push/pull rods is incorporated to move the valves of the high pressure (3 stage design) and the low pressure valves. Precisely, when a cam follower plate moves in a given direction in a plane it imparts lateral motion which acts as a push on one rod end and a pull on the opposite rod end. The two respective rocker arms for a given push/pull rod are in reversed position to each other so that the motion imparted to the valve stems on opposing cylinders is identical in either case. The rocker arms also multiply the motion of the push/pull rods to the valve stems in order to reduce wear and reduce the required travel of the cam follower plates.

Attention is now directed to FIGS. 11, 12, 13, 14, 15, 16, 17, 18, 41, 42, 43, and 44 for treatment of the cam mechanism shown earlier in FIG. 3 generally as reference numeral 150, disposed in compartment 36. These cam mechanisms are operatively connected to the push/pull rods for valve manipulation discussed immediately hereandbefore.

Specifically, (FIG. 18) the cam mechanism 150 includes areas for manipulating the high pressure, intermediate pressure, and low pressure valves. It is to be noted that the high pressure valve mechanism has an automatic centrifugal advance and injection cutoff selection device associated therewith. The single slide assembly 298, 299 associated with the high pressure valve mechanism operates both the intake and exhaust operations. More specifically, the keyed 268 shaft 12 is provided with an internally grooved sleeve 260 slidably disposed thereover and capable of axial translation in response to the outward advancement of centrifugal weights 277, which operate against the spring 270 pressure. The high pressure cam ramp 259 and sleeve 260 has disposed at an end proximate to the centrifugal advance a tab 269 fixedly attached to the sleeve 260 provided with an outwardly extending ear element 276 for pivotal attachment to a first centrifugal arm 273 through pivot pin 275. In turn, the extremity of the arm 273 remote from the pivot pin 275 is provided with a further pivot 274 for attachment thereto of the centrifugal weight arm 272, having the weight 277 supported at a free end and pivoted at 296 to a collar 271 fixed on the shaft 12. A spring 270 is interposed between the collar 271 and element 269 so that the centrifugal force associated in the shaft rotation causes the weights 277 to migrate outwardly against the spring pressure causing the sleeve 260 to move from left to right as shown in FIG. 18. Disposed in overlying relationship on the high pressure cam ramp 259 is a cam tracker plate 299 which when also viewed in FIG. 11 reveals the means by which the push/pull rod 194 can be manipulated. As shown, the push/pull rod 194 that extends to the high pressure rocker 190 is fixedly secured to the cam tracker plate 299. The irregular contour of the cam surface 259 causes the cam follower 319 to move the cam tracker plate 299 within the constraints imposed by U-shaped guide members 298. Accordingly, a lateral translation of the push/pull rods is effected. Having the high pressure sleeve portion 260 pass through an opening centrally provided in plate 299, the follower 319 will follow the contour of the various surfaces 259 disposed upon the cam sleeve 260. For example, step 1 (reference numeral 261) of the cam will provide a specific valve timing for a given engine speed. Attention is directed to FIG. 15 which shows the orientation of step 1 in terms of a top dead center line. The remaining lines radiating counterclock wise and labeled steps 2, 3 and 4 represent the different orientation in a vertical plane of steps 2, 3 and 4 respectively which alters the timing of the high pressure valving as a function of engine/shaft speed, since the cam sleeve 260 will translate from left to right, the faster the engine goes. Typically, a preferred valving arangement for steps 1 through 4 would comprise the following. In step 1, the steam injection would be open at 2° after top dead center, the duration of the injection continuing for approximately 68° of cam lobe arc. The next lower lobe 500 of FIG. 15 refers to the expansion or power stroke which continues for the duration of the raised portion of the cam. Similarly, step 2 would correspond to the injection valve opening at 2° before top dead center and continue in the open condition for 54° of injection thereafter providing an expansion stroke. Step 3 corresponds to an injection opening at 6° before top dead center and remaining on an injection mode for 37° thereafter providing an expansion stroke. Step 4 similarly corresponds to opening at 6° before top dead center continuing on an injection for 54° of arc, thereafter proceeding to the lower ram 500 for the expansion. Due to the fact that at a given engine speed the ideal injection port area for varying points of cut off will vary relative to the actual instantaneous piston speed, the injection cam lobes will vary accordingly in height to provide the correct port opening for a given engine speed and point of cut off. For instance, a higher lobe will cause the injection valve to open wider and would apply to later points of cut off. The first through fourth steps are labeled 261, 262, 263 and 264 respectively in FIG. 18.

A transition ramp is provided from the fourth step to the step 5 in which step 5 corresponds to an exhaust mode over the 360° of flotation. This fifth stage defines an over speed control and obviously only occurs during very high shaft 12 rotation. Please see FIG. 16.

FIG. 42 reflects a full stroke injection cam for increased receiver pressures for high output in certain applications (not illustrated in in FIG. 18). Similarly, FIG. 17 and reference numeral 266 and 267 respectively reflect the sixth step or stage and its associated ramp. Step 6 shown in FIG. 17 provides 180° of injection during the exhaust stroke with no exhausting. Clearly, this situation would provide an engine brake which would be found to be necessary should the shaft 12 rotate at such a speed to cause this cam to be engaged. Also, an engine brake bearing 278 is provided integral with the cam and an engine brake engagement finger 279 is adapted to contact in such a manner as to effect the braking manually and further provide manual override for any given stage.

Figure 11:
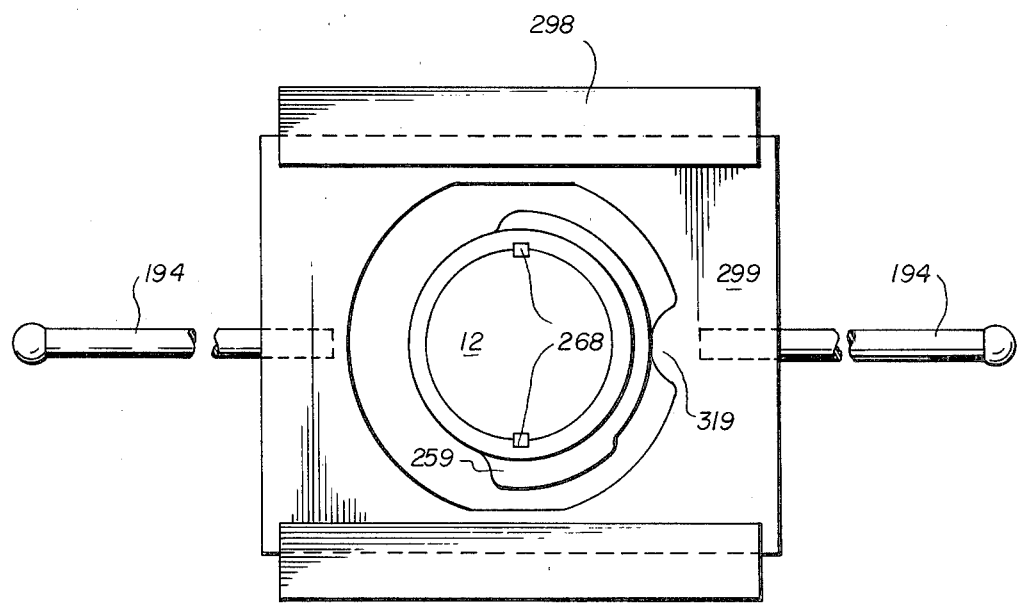
FIG. 11 is an end view illustrating a cam actuating mechanism for a slide valve incorporated in the invention.

Reference numeral 280 is directed generally to an intermediate pressure and low pressure advance mechanism depicted hereandafter, that is adapted to coact with sleeve 281 similarly slidably disposed around the shaft 12 as was the high pressure sliding surface 260. Specifically, an advance mechanism causes a rotation of the sleeve 281 relative to the shaft to affect a different timing mechanism relative to top dead center. To assist in this, a pin 283 extending from a groove 284' in the shaft 12 and extending through a tight fitting hole in a lower portion of sleeve 260 slidably disposed within a groove 284 inside sleeve 281 causes the rotation of the sleeve 281 and therefore alters the timing relationship of the low pressure injection 287 and intermediate pressure injection 288. The sleeve is constrained from gross axial displacement by means of a cross pin 285 fixed to and extending through shaft 12 and rotatably disposed within a groove 286 as shown. Of the remaining two cam surface followers: 289 represents the low pressure exhaust cam follower, and 290 represents the intermediate pressure exhaust cam follower. As shown in FIG. 41, the ear elements 297 are adapted to coact with the rocker arm 218 of FIG. 23. The low pressure injector has a push/pull rod 282 (FIG. 13) which moves the transverse rod 258 of FIG. 19 by means of a rocker 259. FIG. 14 reflects the push/pull rod 248 of FIG. 20 which is the low pressure exhaust stage, and FIG. 12 is the intermediate pressure exhaust, in which an ear element will coact with exhaust rocker 214 (FIG. 23). As shown in the drawings, the push/pull rods 248 (FIG. 14) are connected to ear elements 297. In a further embodiment, the slide 287 in FIG. 13, is substantially H-shaped in which the push rods are affixed to opposed sides of the slide. FIG. 11 suggests the affixion of the push/pull rod 194 directly to a medial center line portion of the slide 299.

Figure 44:
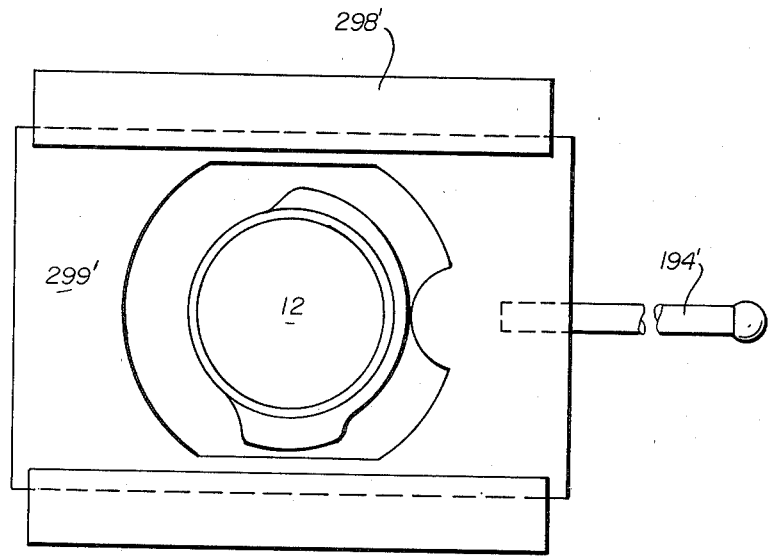
FIG. 44 is a section view of another cam actuating mechanism located next to item 295 on 281 (FIG. 43) when a four stage arrangement is used.
Figure 43:
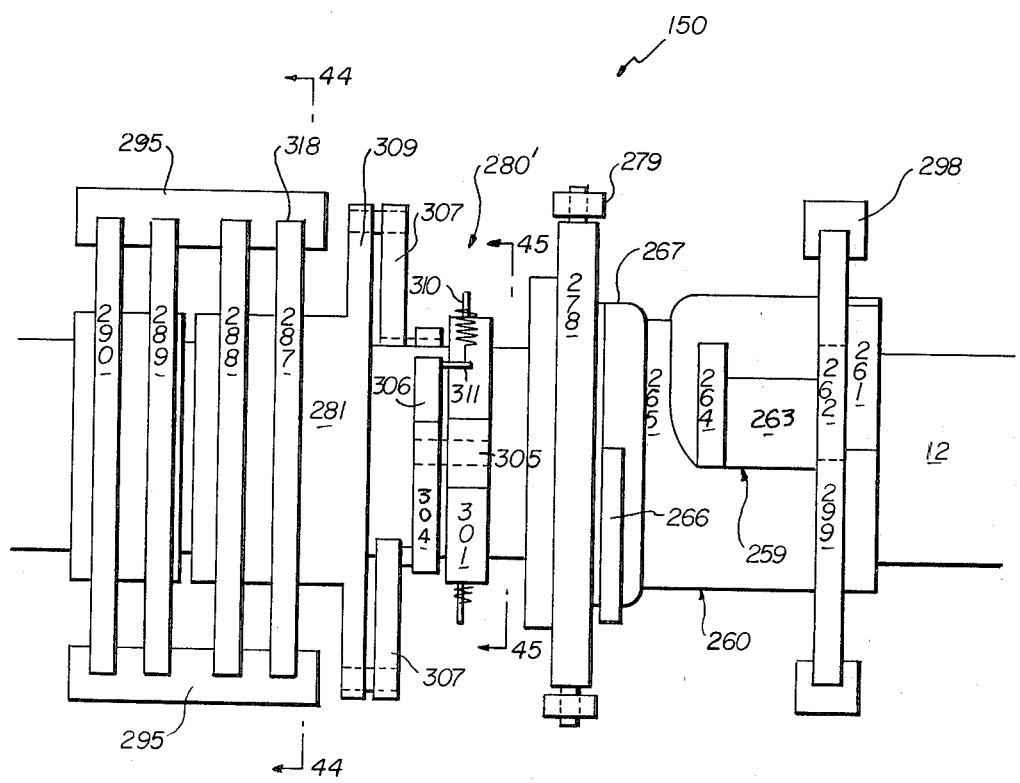
FIG. 43 is a view similar to FIG. 18 illustrating another cam actuating mechanism for a slide valve incorporated in the invention.

FIG. 43 teaches the use of a manual high pressure injection cut off control, the automatic advance mechanism 280' and in addition provides a different version of the slide retention mechanism 295, as well as a modified version of the brake bearing 278. Specifically, a pair of spaced parallel holders 295 are suitably constructed to accommodate a plurality of the slides 290, 289, 288 and 287, each single holder 295, having plural slots 318 for the slidable insertion therein of the slide member. FIG. 44 is a sectional view which would be inserted along lines 44—44 of FIG. 43 which the quadruple expansion design is used and is somewhat similar to FIG. 11 and therefore bears reference numerals 194', 298' and 299'. The difference is that this device is to be used with a four stage steam engine having a further stage between the high pressure and intermediate pressure stages and will be discussed hereinafter. Accordingly, a single push rod is required on each of the first two stages 140 and 140' (FIG. 4).

FIG 45 is a view taken along lines 45—45 of FIG. 43 and reveals another form of the advance mechanism for the intermediate pressure and low pressure injection stages. Specifically, the shaft 12 has keyed 302 thereon an annular sleeve 301 having first and second pins 310 from which extends first and second springs 308. These springs have termini remote from the pins 310 provided with additional pins 311 extending outwardly from centrifugal weight 306 arranged for pivotal 305 motion on an angle bar 304, an extremity of which is similarly pivoted at 312 to a link 307 adapted to rotate arm 309 which is affixed to the sleeve 281 (FIG. 43). Consequently, rotation of the shaft 12 having the ear members 303 attached causes the centrifugal weights 306, to extend outwardly by pivoting at point 305, to provide a motion through a linkage 307 to turn arms 309, and therefore the sleeve 281. This of course has the effect of advancing or retarding the valve operation of the intermediate and low pressure stages.

FIGS. 46 and 47 show an alternative mechanism which instead of having the links 307 and arms 309 mentioned above, uses a gear train for providing the rotation of the sleeve 281. Specifically, the sleeve 281 is provided with a plurality of teeth 313 on an outer annular face thereof, which coact against the gear teeth 314 which rotates by virtue of attachment to the centrifugal weight 317 via link 315 against the biasing of spring 308 provided with pin 310. In this way, rotation of the sleeve during engine rotation can be effected. It becomes obvious that when the manual cut off mechanism FIG. 43 is in use the engine does not benefit from over speed protection as given in FIG. 18 with automatic cut off system; therefore over speed protection is provided by an electronic tachometer which will read the rotative speed of the crank shaft and be programmed to close a solenoid valve located between the boiler and the throttle at a predetermined speed of rotation.

As discussed in part supra, the invention is not intended to be limited to an engine having merely a high pressure, intermediate pressure and a low pressure piston arrangement. In fact, FIG. 4 teaches the use of another arrangement which has a stage between the high pressure and intermediate pressures. Specifically, a four stage steam device is provided with the dimension of one of the high pressure pistons changed to a somewhat larger diameter piston 140' (when compared to the first embodiment) and steam exhausted from the high pressure stage 140 would be admitted into the stage 140' either with or without reheating as is desired. FIG. 44 teaches the use of a first intermediate valve operator assembly should this configuration be adopted. Additionally, however it should be appreciated that various other stages are intended to be within the scope and fair meaning of the patent application as set forth hereinabove.

Figure 25:
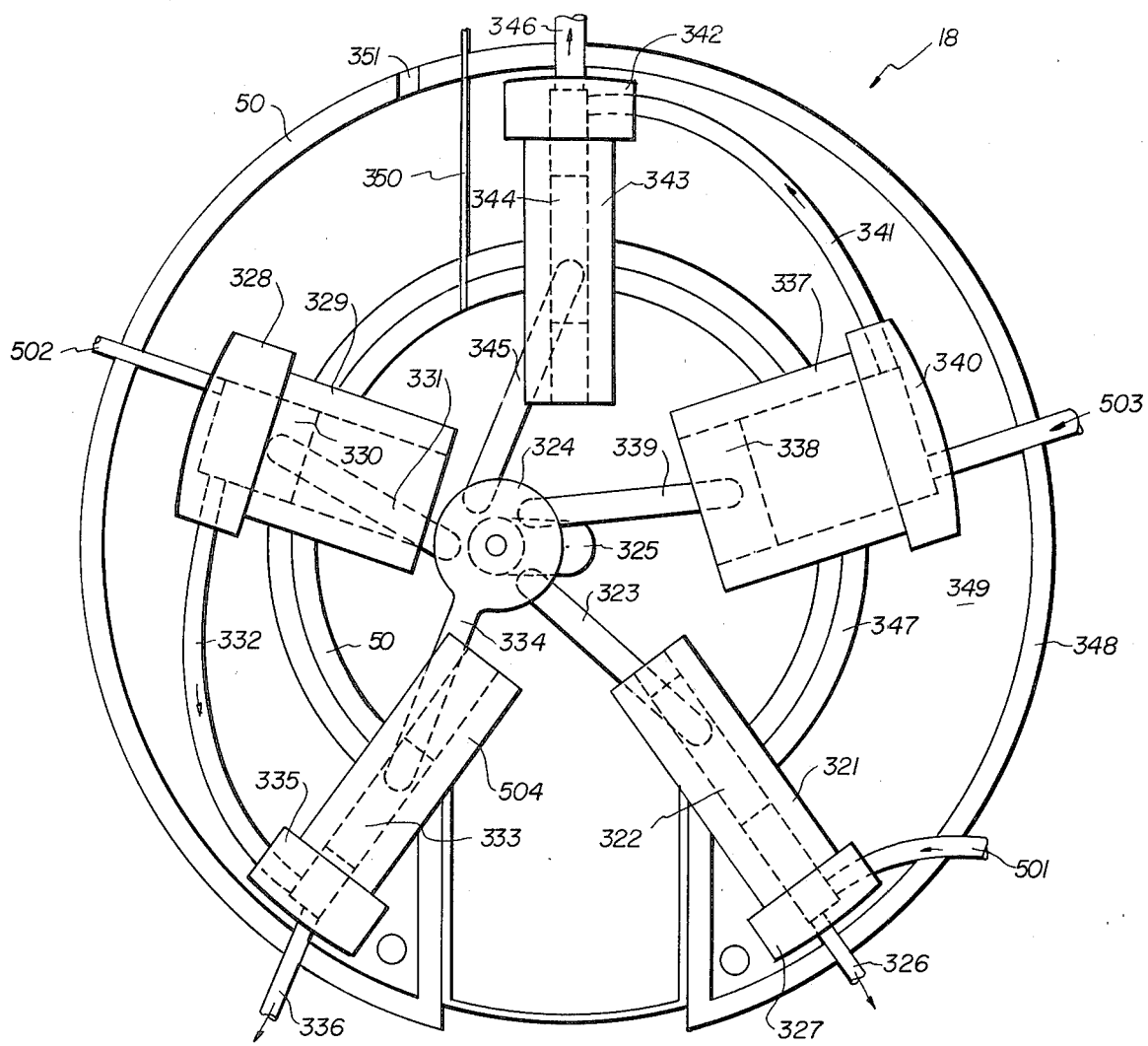
FIG. 25 is an end view of the regenerative pump incorporated in the the steam engine of the invention.

FIG. 25 is directed to a regenerative pump which can be considered an optional accessory, which is formed having a plurality of inlets and outlets, the salient purpose of the regenerative pump being to efficiently extract some of the available energy from partially expanded steam, for the purpose of feedwater heating, thus avoiding giving up so much latent heat to the condenser. As shown in the flow chart in FIG. 1, the regenerative pump 18 receives steam from the high pressure, intermediate pressure and low pressure exhaust stages before reheating.

More specifically, the regenerative pump 18 takes the form of a rotary compressor operated by rotative power from the engine through connection to the drive shaft 12. Steam bled from the first stage exhaust via conduit 501 is drawn into the first stage of the regenerative pump having a cylinder 321 and a piston 322 slidably disposed therein. The piston 322 is operatively connected to a connecting rod 323 fixed to a hub 324 connected in turn by a link 325 to the drive shaft 12 from which it receives its powered rotary motion. A cylinder head 327 is provided with unidirectional valving to allow the ingress of steam from the first exhaust stage. The steam is thereafter compressed through an outlet valve into conduit 326 thence into the economizer. Similarly, steam bled from the second stage exhaust via conduit 502 is induced through the cylinder head 328 of the second pump of the regenerative system, having a cylinder 329, and a piston 330 which is operatively connected to a connecting rod 331 similarly disposed on hub 324. Compressed steam travels through conduit 332 and into the compounding second stage pump with piston 333 and cylinder 504 having a connecting rod 334 connected to hub 324, the piston 333 having a smaller diameter than piston 330 for further compression. The valving associated with the cylinder head 335 allows the compressed steam to be forced into the economizer through conduit 336. Likewise, steam bled from the low pressure exhaust of the engine via conduit 503 is directed into the largest dimensioned piston cylinder arrangement, for extraction of steam's energy, the cylinder 337 having a piston 338 and operatively associated connecting rod 339 to hub 324 which is in combination with cylinder head 340 and its associated unidirectional valving. The compressed steam passes through conduit 341 to the compounding second stage having a cylinder head 342, a cylinder 343, a piston 344 and associated connecting rod 345. Steam is compressed therefrom into conduit 346 thence into the economizer. Insulation 50 is provided in an annular sleeve of the regenerative pump, and inner annular portion is similarly insulated by insulation 50, the inner wall 347 allowed to communicate with the outer wall 348, the space therebetween defining a heat jacket 349. In this way, more available BTUs of energy from the steam initally heated in the furnace is extracted and used. A vacuum line 350 is provided which proceeds to a trap and filter and condenser to be described shortly. In addition, the heat jacket 349 being of spaced wall construction allows furnace exhaust to pass therethrough, the furnace exhaust being ducted to outlet 351 for further processing.

Because the regenerative pump bleeds steam from engine receivers and because the regenerative pump takes power from the engine in order to operate, it is desirable to have a means of relieving the system thereof. This may be accomplished by interposing a clutch between the engine drive shaft 12 and the regenerative pump crank shaft 325. Much the same effect can be accomplished by interposing valves on the bleed lines to the regenerative pump allowing the stoppage of exhaust steam to the regenerative pump. Further, the regenerative pump may be used to help retard a load on the engine. This braking effect is realized by placing restricting valves which can be made selectively operative in the exhaust lines coming out of the pump cylinders, thereby, retarding the rotative motion of the pump which retarding effect is translated to the load via the drive shaft 12.

Also, it is apparent that the structure of the regenerative pump is adaptable to use as an engine per se, with the several stages, valving, oiling, engine placement, engine heat, reheat, and the other associated systems being essentially as those described within the context of this invention. In this regard it is also apparent that the steam engine described in this description and drawngs is also adaptable to being utilized as a compressor or a regenerative pump if pump valves common to the art are installed and the unit is driven. In such a case the function would be the same as that given for the regenerative pump FIG. 25.

Attention is now directed to FIG. 40 in which an overall schematic of various aspects of the liquid flow will now be made manifest. The gathering place for substantially all fluids used in the engine is revealed in FIG. 40 and in which for example liquid from the condenser 13 as a condensed product of the final engine exhaust and liquid from the expansion chamber 21 will pass downwardly and traverse to the hot well 17. Additionally, the bleed from the receiver pressure regulator (FIG. 26), some fluid from the vacuum pump FIG. 39 to be discussed shortly, as well as liquid from the optional deaerator to be discussed (FIG. 38) are all recycled. Thus the caloric content of the liquid can be beneficially retained, more energy can be extracted from the steam and a minimal volume of liquid be required, a hallmark of the engineering according to the present invention. Additionally, crankcase vapors caused by blowby and the like from the engine area 34 pass through conduit 352 and encounter a steam trap 353 which stops the liquid, a waste trap 354 being downwardly disposed and fed thereby provides a further separation so that non-contaminated fluid may pass to the filter 355 thence downwardly through conduit 356 into the hot well 17.

The purpose of the line 352 being to maintain the internal crankcase area under reduced pressure (vacuum). It is to be noted that the crank case walls, Ref. No. 506 FIG. 10 and the crankcase cover plates-bearing housings, Ref. No. 505 and 505' FIG. 3, define an internal sealed crank case area which lends itself to being held under a vacuum for mechanical and thermodynamic advantages. The valve mechanism area 36 is also sealed and subject to the same vacuum. Additionally, an exhaust steam bleed line 359 emanating from the low pressure exhaust line 231 passes into an optional makeup feedwater distillation unit 361 having a plurality of coils placed in heat exchange relationship with the exhaust furnace heat. Further heat input is thus provided from furnace exhaust 56–57 (FIG. 32), which provides heat through a manifold 358 via damper 357 into distillation unit 361 and exhausting via holes 368 in the wall of the distillation unit so that distillation can proceed and provide a vapor into conduit 365 leading to the condenser 13 as shown by the arrow. A make up feed water reservoir 362 having a sealed cap 363 and pressure equalization line 364 connecting the chamber 362 and the conduit 365 is provided. The purpose of this system is to allow additional water to be added or to replace the fluid which is normally lost, when an amount of the liquid escapes from the system to the atmosphere. Vapor contained in conduit 365 engages a condenser generally designated 13 with associated louvers 14 and 19 (FIG. 2) operatively connected on the front and rear faces of the condenser 13 which causes a change of phase of the fluid which discharges into the hot well 17. A liquid lever sensor in the hot well 17 activates the makeup feedwater system by activating solenoid valve 360 and furnace exhaust damper 357.

Figure 39:
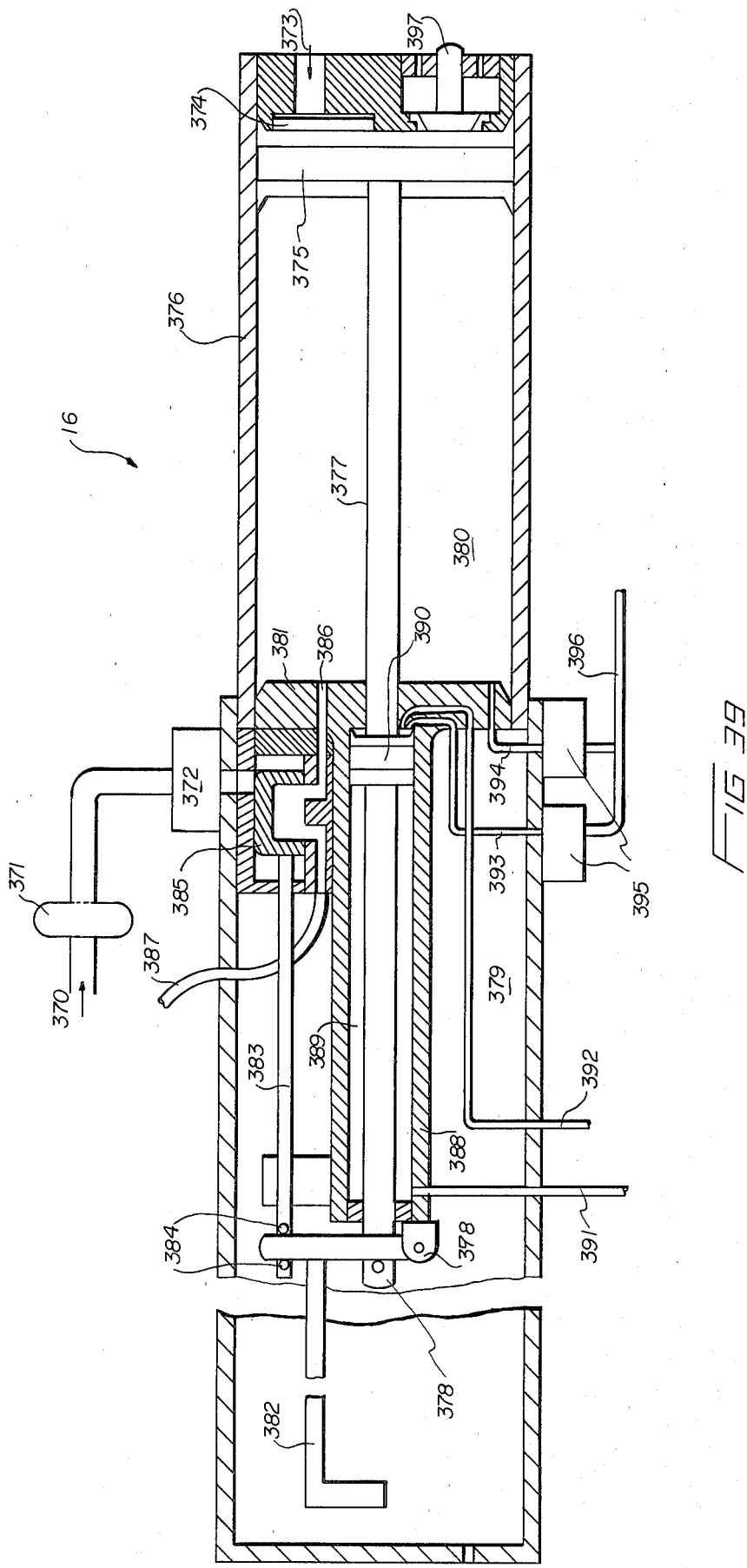
FIG. 39 is a longitudinal sectional view of the vacuum pump incorporated in the invention.

As shown in FIGS. 39 and 1 a modicum of steam from the intermediate exhaust stage is introduced into the vacuum pump 16 through inlet 370. The quantum of steam extracted from the intermediate pressure stage may be regulated by an optional pressure regulator 371. The steam in conduit 370 encounters a solenoid valve 372 which is operative as a function of a vacuum indicator provided either in the hot well or the condenser as desired so as to selectively manipulate the solenoid valve 372 from one position to another. The vacuum pump 16 includes an inlet 373 through which aerated fluid passes via a valve 374, being drawn by a piston 375 carried within a cylinder 376 defining a casing of the vacuum pump 16. Translation of the piston laterally to the left will cause an associated piston rod 377 to migrate therewith, thereby introducing the fluid and air within the area to the right of the piston. A terminus 378 of the rod 377 provided in a second chamber 379 remote from the chamber within which the piston is disposed 380 and separated therefrom by a sealing wall 381 will engage a lever 382 at its remote length of travel, the lever 382 operatively connected to valve stem 383 by means of first and second pins 384 to toggle the slide valve 385 between first and second positions, thereby directing steam flow to and from chamber 380. Steam passing the solenoid 372 will not be admitted with the valve 385 as shown in FIG. 39, in exhaust position exhausting through 387 to the expansion chamber 21, but when the terminus 378 causes the lever 382 to move the valve stem 383 leftward, the passageway 387 will be temporarily occluded, but the passageway to 386 from the steam chest will be opened, allowing communication of the steam contained in conduit 370 into the passageway 386 which returns the piston 375 to the right as in FIG. 39 expelling the air in area 380 through valve 397. The lever 382 is pivoted at 398 attached to inner cylinder 388 defining a second inner chamber 389 having a second piston 390 contained therein, piston 390 being single acting and operatively connected to the piston rod 377. An outlet 391 is provided within the chamber 389 at one extremity, and a second conduit 392 allows steam to be introduced to the right hand side of the second piston 390. The first line 391 is a vacuum line which extends to the hot well to provide no back pressure, while the steam pressure in line 392 acting against the second piston 390 forces the piston 375 to traverse left to the bottom of the stroke. Conduits 393 and 394 respectively allow bleed off of liquid within the two cylinders, and these two lines pass through liquid traps 395 which in turn are connected to a conduit 396 which drains off liquid and passes the liquid to the hot well. The significance of the vacuum pump is substantial. Because of this simple steam driven arrangement, the engine can operate in a closed system with a minimum of back pressure and high expansion ratios. Valve 397 is provided on the right hand side of the casing 376 and exhausts air to the atmosphere.

A deaerator, disclosed in FIG. 38, is optional, depending on different job requirements, and taken in conjunction with FIG. 1 shows an input from the water injector pump 144 through conduit 402 as well as low pressure steam from the final exhaust through conduit 405. Specifically, the water injector pump 144 provides liquid to a conduit 402, which will either pass through the one way valve 403 to the boiler via conduit 404 or through a solenoid valve 401 through conduit 409 into deaerator 400. Low pressure steam from the final exhaust is carried in conduit 405 and passes through the controller's 27 electrode 71, 72 operated solenoid valve 401 discussed in FIG. 30 to actuate the deaerator 400. Steam passes solenoid valve 401 into conduit 406 where it is exhausted into an upper portion of a container 408 above a liquid level of fluid, and steam is sprayed through nozzle 407 therein. Additionally, liquid contained in conduit 409 passes from solenoid valve 401 into a similar nozzle 410 and provides a water spray mist. The loop in 409 indicates a pass through a region of furnace exhaust to add heat to water to be deaerated. The liquid 412 in the container interior 408 is controlled by a float 411 so that the water level in the container 408 is maintained by valve 413 which selectively operates an opening to conduit 414 for passage therethrough of liquid to the hot well 17. A secondary condenser 415 is provided having an inlet 416 on one side for the admission of steam and air into a manifold 417 and a plurality of heat exchange conduits 418 which serves as a deaerator and condenser. A remote extremity of the deaerator condenser is provided with condensate return line 419 and a lower manifold which allows air upward migration through the manifold 420 to vent the air into the atmosphere via the vacuum pump 16. From the manifold 420 a conduit 422 extends in which any accumulated air and uncondensed steam will pass through the condenser 13 to the hot well where air is finally drawn off by the vacuum pump. It is contemplated that the water injection pump 144 may be of a two step arrangement: the first step pump would be of larger volume/lower pressure (possibly 100 to 200 psi) to assure an adequate positive flow to the smaller high pressure injection pump (the second step). If a deaerator is installed on a given unit, then the first step would be used to supply the water for that purpose. Filters are to be installed in all liquid lines.

In relation to the condenser and vacuum system it must be recognized that the engine and associated systems can operate non-condensing and/or without any vacuum. Also it is clear that the condenser need not be air cooled; under certain conditions, such as marine or stationary applications for instance, a liquid cooled condenser may be more favorable.

The method of freeze protection lies within the scope of the invention. Because the unit is well insulated, interconnected and virtually closed off from ambient conditions, a small internal heat source such as a pilot light, provides sufficient heat. Such heat source can be thermostatically automatically activated. Further, the hot well is shaped with inwardly sloping walls, like an ice tray, and space above the liquid level is maintained to provide for expansion should freezing occur there.

The high ratios of expansion of either the 3 stage or the 4 stage engine design make the use of super-critical pressure steam feasible. When using super-critical pressures the steam separator 28 is deleted from the system and enough boiler-superheater tubing must be provided so that all generated steam will have a leaving temperature to the throttle at the desired superheat temperature. In such cases the means of control is slightly different, as follows:

(1) Provide a heat sensor in the furnace area that will control furnace temperature at the tubes to the desired heat.

(2) Provide a heat sensor just outside the boiler-furnace area that will sense the temperature of the water tube and will actuate the injector pump whenever the temperature reaches the point corresponding to the desired super-critical pressure/temperature.

(3) Provide another heat sensitive control farther away from the boiler-furnace area than the preceeding one. This sensor will automatically close the fuel line valve should the tube temperature at that point reach the super-critical pressure/temperature point.

(4) Include a pressure responsive piston assembly like the one used on the sub-critical units except that this assembly is set for the higher super-critical pressures.

Because this engine design has crank throws at 180° opposition, there are two dead center points per revolution. This being the case, a starter is utilized to initiate desired rotation in the event the engine should come to rest at or near a dead center.

As touched on earlier, in some cases higher economy and efficiency (by matching a specific engine with a specific job requirement) would dictate that engines of somewhat different configurations and different stages of expansion may be best provided to alter the engine speed, operating characteristics, torque, and the like. Accordingly, the number of heat stages and number of piston and inlet and exhaust pressures etc. can be varied and still not depart from the scope of the invention as set forth hereinabove and defined hereinbelow by the claims. Specifically, attention is directed to FIGS. 4 through 9 in which different dispositions of the different engine components are set forth illustrating the various mechanism that are believed to be within the purview of the instant application. Rather than use the reference numerals generated hereinbefore, the following will be illustrative by merely assigning the low pressure, intermediate pressure and high pressure to the engine configuration shown therewithin to illustrate the flexibility of the invention according to the instant application. For example, FIGS. 5, 7 and 8 indicate placement of the low pressure, intermediate pressure and high pressure arrangements can be reversed from that which is shown in FIG. 6, and FIG. 9 modifies the arrangements of components such as the boiler, furnace, and condenser. This shows that the arrangements of the components are not critical, but rather the interrelationship of all components. Moreover, having thus described the invention, it should be apparent that numerous structural modifications are contemplated as being a part of this invention as set forth hereinabove and defined hereandbelow by the claims.

What is claimed is:

1. A unitary steam engine comprising, in combination, a casing having an interior, a source of fuel in said casing, an enclosure including a furnace of circular cross-sectional shape disposed within said casing interior, said enclosure having an axially extending central passage and including a plurality of coaxially arranged tubular partitions disposed in surrounding relationship with said furnace, said tubular partitions defining a plurality of radially spaced annular chambers, an axially extending drive shaft rotatably mounted in said enclosure central passage and having an end portion extending outwardly of said casing, a plurality of annularly arranged boiler tubes disposed within said furnace, a source of water in said casing, means for circulating water from said source through said boiler tubes, means in said furnace for generating hot gases from said fuel, means for circulating said hot gases over said boiler tubes in heat transfer relationship therewith to generate steam, a plurality of cylinder/piston assemblies mounted in said casing, means for drivably connecting said pistons to said drive shaft, means including a throttle and a plurality of slide valve means each operatively associated with a respective one of said cylinder/piston assemblies for conducting said generated steam to said cylinder/piston assemblies for reciprocating said pistons to rotate said drive shaft, cam means mounted on said drive shaft for actuating said slide valve means, means including a condenser for converting steam exhausted from said cylinder/piston assemblies to condensate and means for returning said condensate to said source of water.

2. A steam engine in accordance with claim 1 wherein said plurality of cylinder/piston assemblies are arranged in a plurality of stages for operation at varying pressure levels and means for conducting steam sequentially through said plurality of stages for operating each of said stages at descending pressure levels.

3. A steam engine in accordance with claim 2 wherein said plurality of stages include a high pressure stage, an intermediate pressure stage and a low pressure stage.

4. A steam engine in accordance with claim 1 including an annularly arranged superheater tube in one of said annular chambers and means for conducting steam from said boiler tube to said superheater tube to superheat said steam.

5. A steam engine in accordance with claim 4 wherein said means for conducting steam from said boiler tubes to said superheater tubes include means for controlling the flow of water from said source to said boiler tubes.

6. A steam engine in accordance with claim 1 wherein said means for generating said hot gases comprise a combustion chamber in said furnace adjacent said boiler tubes, a fuel injection nozzle for injecting fuel from said source of fuel into said combustion chamber for burning said fuel, means for conducting said fuel from said fuel source to said injection nozzle and means including a damper for introducing combustion air into said combustion chamber.

7. A steam engine in accordance with claim 3 including first reheater tubes disposed in a second one of said annular chambers, means for conducting exhaust steam from said cylinder/piston assemblies in said high pressure stage to said first reheater tubes, means for conducting hot combustion gases from said combustion chamber to said second one of said annular chambers in heat transfer relationship with said first reheater tubes and means for conducting steam from said first reheater tube to said cylinder/piston assemblies in said intermediate pressure stage.

8. A steam engine in accordance with claim 7 including a second reheater tube disposed in a third one of said annular chamber, means for conducting exhaust steam from said cylinder/piston assemblies in said intermediate pressure stage to said second reheater tube, means for conducting hot combustion gases from said combustion chamber to said third one of said annular chambers in heat transfer relationship with said second reheater tube and means for conducting steam from said second reheater tube to said third cylinder/piston assemblies in said low pressure stage.

9. A steam engine in accordance with claim 8 including an annularly arranged preheater tube disposed in one of said annular chambers in a helical configuration for preheating the water circulated between said source of water and said boiler tubes and means for conducting combustion gases from said combustion chamber to said one annular chamber to heat the water flowing in said preheater tube.

10. A steam engine in accordance with claim 7 including first regenerative pump means, means for drivably connecting first regenerative pump means to said drive shaft and means for conducting steam from said first stage exhaust to said regenerative pump means.

11. A steam engine in accordance with claim 10 including an economizer, means for pumping water from said source of water to said economizer, means for conducting steam compressed from said first regenerative pump means to said economizer to heat the water pumped to said economizer and means for conducting said heated water from said economizer to said boiler tubes.

12. A steam engine in accordance with claim 11 wherein said means for circulating water from said source through said boiler tubes include a steam separator including a plurality of first tubes for conducting water from said economizer to said boiler tubes and a plurality of second tubes communicating with said plurality of first tubes for conducting steam within said plurality of first tubes from said boiler tubes to said superheater tubes.

13. A steam engine in accordance with claim 10 including second regenerative pump means, means for conducting exhaust steam from said intermediate stage exhaust to said second regenerative pump means and means for drivably connecting said second regenerative pump means to said drive shaft.

14. A steam engine in accordance with claim 13 including third regenerative pump means, means for conducting exhaust steam from said low pressure stage to said third regenerative pump means, means for drivably connecting said third regenerative pump means to said drive shaft and means for conducting compressed steam/liquid from said first, second and third regenerative pump means to said economizer.

15. A steam engine in accordance with claim 2 including a vacuum pump having an inlet communicating with a hot well for drawing air from said hot well said vacuum pump having an outlet for expelling said air and an inlet communicating with said steam conducting means for steam operation of said vacuum pump.

16. A steam engine in accordance with claim 15 wherein said steam conducting means for said vacuum pump include means for conducting exhaust steam from said intermediate pressure stage to said vacuum pump.

17. A steam engine in accordance with claim 11 wherein said source of water comprises a hot well reservoir in said casing and wherein said pumping means comprises a water injector pump having an inlet communicating with said reservoir and an outlet communicating with said economizer and means for operatively connecting a controlling means to said water injector pump for controlling the pumping of water to said economizer by said pump.

18. A steam engine in accordance with claim 17 including an expansion chamber having an inlet communicating with said low pressure stage for receiving exhaust steam, said expansion chamber having an outlet communicating with said condenser for conducting exhaust steam expanded in said expansion chamber to said condenser.

19. A steam engine in accordance with claim 3 including makeup feedwater means having an inlet and outlet, means for conducting exhaust steam from said low pressure stage to said makeup feedwater distillation means and means for conducting water vapor from said makeup feedwater means to said condenser.

20. A steam engine in accordance with claim 3 wherein said intermediate stage includes first and second pressure stages.

21. A steam engine in accordance with claim 18 wherein said expansion chamber includes means to regeneratively preheat the air, water and fuel.

22. A steam engine in accordance with claim 9 wherein said means for conducting combustion gases includes a plurality of baffles disposed in said furnace, said combustion gases meandering around said boiler and superheater tubes.

23. A steam engine in accordance with claim 3 including brake means on said cam means for altering the timing of said slide valve means to provide a braking force on the engine.

24. A steam engine in accordance with claim 23 including means for lubricating said cam means and said cylinder/piston assemblies provided with means for separating lubrication from the steam.

25. A steam engine in accordance with claim 16 including means for mitigating internal crankcase pressures comprising means whereby said crankcase is maintained in an evacuated state.

26. A steam engine in accordance with claim 24 including means for altering the timing of said engine while running on said cam means.

27. A steam engine in accordance with claim 5 wherein said means for controlling the flow of water from said source to said boiler tubes comprises a liquid storage means, sensing means operatively disposed in said storage means for sensing liquid level therein, a means for sensing the pressure head of the liquid in said storage means, said pressure head sensing means operatively connected to control said fuel burner, said liquid level sensing means controlling placement of water in said boiler tubes.

28. A steam engine in accordance with claim 18 including means for controlling air flow over said condenser surfaces.

29. A steam engine in accordance with claim 5 wherein fuel and water injector pump means are provided, operatively driven by said cylinder/piston assembly.

30. A steam engine in accordance with claim 23 wherein said regenerative pump means includes additional brake means and means to relieve engine of said regenerative pump load.

31. A steam engine in accordance with claim 3 wherein said engine cylinders are provided with a means of heating by furnace exhaust means.

32. A steam engine in accordance with claim 1 wherein means are provided to prevent high internal pressures within said throttle and slide valve means from acting mechanically against relatively low ambient external pressures through their respective stem means.

33. A steam engine in accordance with claim 3, including means to increase engine power output by bypassing steam pressure around said high pressure stage.

34. A steam engine in accordance with claim 27 wherein said means for controlling includes furnace fuel supply means responsive thereto for altering furnace heat.

35. A steam engine in accordance with claim 1 including plural cylinder/piston assemblies with means to gang together said cylinder/piston assemblies and a means to support said ganging means, said support means including means to control motion of said ganging means.

36. A steam engine in accordance with claim 25 including insulating means to shield said crankcase and valve operator areas from said furnace exhaust heat and means to provide cooling air to said crankcase and valve operator areas.

37. A steam engine in accordance with claim 1 including means for controlling flow of combustion air and pre-heating said combustion air by said combustion gases.

38. A steam engine engine in accordance with claim 17 wherein said source of water includes means for deaerating said water.

39. A steam engine in accordance with claim 29 wherein said pump means includes fuel pressure responsive means to maintain fuel pressure.

40. A steam engine in accordance with claim 1 wherein said engine is formed as an integral structure comprised of engine components.

41. A steam engine in accordance with claim 33 including a pressure regulator means disposed between said bypass means and reheater means.

42. A steam engine in accordance with claim 26 including means to adjust engine power output by controlling means of adjusting first stage injection duration.

* * * * *

UNITED STATES PATENT AND TRADEMARK OFFICE
CERTIFICATE OF CORRECTION

PATENT NO. : 4,395,885

DATED : August 2, 1983

INVENTOR(S) : John A. Cozby

It is certified that error appears in the above-identified patent and that said Letters Patent are hereby corrected as shown below:

Column 8 line 7 change "level" to --lever--

Column 14 line 23 change "133" to --113--

Column 15 line 31 change "253" to --235--

Column 15 line 38 Change "281" to --282--

Column 17 line 19 change "ram" to --ramp--.

Signed and Sealed this

Tenth Day of January 1984

[SEAL]

Attest:

Attesting Officer

GERALD J. MOSSINGHOFF

Commissioner of Patents and Trademarks